US012405593B2

(12) United States Patent
Weiss et al.

(10) Patent No.: US 12,405,593 B2
(45) Date of Patent: Sep. 2, 2025

(54) COMPUTER AIDED DESIGN WITH GEOMETRY FILTERING TO FACILITATE MANUFACTURING

(71) Applicant: Autodesk, Inc., San Francisco, CA (US)

(72) Inventors: Benjamin McKittrick Weiss, Tualatin, OR (US); Jesus Rodriguez, Farmington, MI (US); Ebot Etchu Ndip-Agbor, Portland, OR (US); Nigel Jed Wesley Morris, Toronto (CA); Adrian Adam Thomas Butscher, Toronto (CA)

(73) Assignee: Autodesk, Inc., San Francisco, CA (US)

( * ) Notice: Subject to any disclaimer, the term of this patent is extended or adjusted under 35 U.S.C. 154(b) by 357 days.

(21) Appl. No.: 17/978,836

(22) Filed: Nov. 1, 2022

(65) Prior Publication Data

US 2023/0152778 A1 May 18, 2023

Related U.S. Application Data

(60) Provisional application No. 63/280,530, filed on Nov. 17, 2021.

(51) Int. Cl.
*B33Y 50/02* (2015.01)
*G05B 19/4099* (2006.01)

(52) U.S. Cl.
CPC ......... *G05B 19/4099* (2013.01); *B33Y 50/02* (2014.12); *G05B 2219/35134* (2013.01)

(58) Field of Classification Search
CPC .................................................. B33Y 50/02
See application file for complete search history.

(56) References Cited

U.S. PATENT DOCUMENTS 6,180,050 B1 * 1/2001 Arai ..................... B29C 64/135
425/375
10,456,979 B2 10/2019 Hartmann et al.
(Continued)

FOREIGN PATENT DOCUMENTS

CN 103302664 A * 9/2013 ............ B25J 9/1697
EP 3182308 6/2017

OTHER PUBLICATIONS

Extended European Search Report in European Appln. No. 22205650. 9, dated Apr. 11, 2023, 11 pages.
(Continued)

*Primary Examiner* — Suresh Suryawanshi
(74) *Attorney, Agent, or Firm* — Fish & Richardson P.C.

(57) ABSTRACT

Methods, systems, and apparatus, including medium-encoded computer program products, for computer aided design of physical structures using techniques that facilitate manufacturing, include: modifying a three dimensional shape, for which a corresponding physical structure is to be created using a manufacturing process, to produce a modified three dimensional shape; and providing the modified shape of the modeled object for use in manufacturing the physical structure using one or more computer-controlled manufacturing systems that employ the manufacturing process. The modifications can include, for each of two or more discrete layers of the three dimensional shape along a direction associated with the manufacturing process, extracting a two dimensional profile representation of the three dimensional shape in a current discrete layer, offsetting the two dimensional profile representation by an amount associated with the manufacturing process, and changing a next discrete layer using an offset two dimensional profile representation of the current discrete layer.

54 Claims, 18 Drawing Sheets

(56) References Cited

U.S. PATENT DOCUMENTS

| | | | |
|---|---|---|---|
| 10,613,496 | B2 | 4/2020 | Suresh et al. |
| 2017/0176975 | A1* | 6/2017 | Pedersen ................. G06F 30/20 |
| 2017/0216915 | A1* | 8/2017 | Holcomb ................ B22F 10/16 |
| 2018/0052433 | A1* | 2/2018 | Vernon ................. B33Y 50/00 |
| 2018/0330029 | A1 | 11/2018 | Pedersen et al. |
| 2019/0079491 | A1 | 3/2019 | Barua et al. |
| 2019/0197773 | A1* | 6/2019 | Schmidt ................. G06T 17/20 |
| 2020/0108560 | A1 | 4/2020 | Qian |
| 2020/0122403 | A1 | 4/2020 | Dhokia et al. |
| 2020/0342067 | A1 | 10/2020 | Yu et al. |
| 2020/0410061 | A1 | 12/2020 | Raghavan et al. |
| 2021/0073349 | A1 | 3/2021 | Mirzendehdel et al. |
| 2021/0173979 | A1 | 6/2021 | Gerzen et al. |
| 2021/0214013 | A1 | 7/2021 | Monteith |
| 2021/0216674 | A1 | 7/2021 | Hiller et al. |
| 2021/0252792 | A1 | 8/2021 | Sinclair |
| 2021/0299962 | A1 | 9/2021 | Qian et al. |

OTHER PUBLICATIONS autodesk.com [online], "Achieving Better Additive Manufacturing Outcomes in Generative Design," Dec. 18, 2020, retrieved on Apr. 5, 2022, retrieved from URL <https://www.autodesk.com/products/fusion-360/blog/unlocking-better-additive-manufacturing-outcomes-generative-design/>, 15 pages.

Brackett et al., "Topology Optimization for Additive Manufacturing," 2011 International Solid Freeform Fabrication Symposium, University of Texas at Austin, Aug. 17, 2011, 15 pages.

Driessen, "Overhang constraint in topology optimisation for additive manufacturing: a density gradient based approach," Thesis for the degree of Master of Science, Delft University of Technology, Department of Precision and Microsystems Engineering, Feb. 9, 2016, 85 pages.

Fu et al., "Optimizing 3D Self-Supporting Topologies for Additive Manufacturing," ICCMS '20, Brisbane, QLD, Australia, Feb. 26-28, 2020, Proceedings of the 12th International Conference on Computer Modeling and Simulation, Jun. 2020, 4 pages.

Gaynor et al., "Topology optimization considering overhang constraints: Eliminating sacrificial support material in additive manufacturing through design," Struct Multidisc Optim., 2016, 54(5):1157-1172.

Guo et al., "Self-supporting structure design in additive manufacturing through explicit topology optimization," Comput. Methods Appl. Mech. Engrg., Aug. 2017, 323:27-63.

Langelaar, "An additive manufacturing filter for topology optimization of print-ready designs," Struct Multidisc Optim., 2017, 55:871-883.

Tutum et al., "Functional Generative Design: An Evolutionary Approach to 3D-Printing," GECCO '18: Genetic and Evolutionary Computation Conference, Kyoto, Japan, Jul. 15-19, 2018; ACM, Article 4, 8 pages.

Wang et al., "Level set-based topology optimization with overhang constraint: Towards support-free additive manufacturing," Comput. Methods Appl. Mech. Engrg., 2018, 339:591-614.

\* cited by examiner

COMPUTER AIDED DESIGN WITH GEOMETRY FILTERING TO FACILITATE MANUFACTURING

CROSS-REFERENCE TO RELATED APPLICATION

This application claims the benefit of priority of earlier U.S. Application No. 63/280,530, entitled "COMPUTER AIDED DESIGN WITH GEOMETRIC FILTERING TO FACILITATE MANUFACTURING", and filed on Nov. 17, 2021, which application is incorporated herein by reference in its entirety.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modeled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold) and molding.

In addition, CAD software has been designed to perform automatic generation of 3D geometry of one or more parts in a design (known as "topology optimization", "generative design", or "generative modelling", among others). This automated generation of 3D geometry often works within a "design domain" specified by a user or the CAD software and generates geometry typically by optimizing design objectives and respecting design constraints, which can be defined by the user, CAD software, or a third party. The design objectives can include but are not limited to minimizing waste material, minimizing the weight of the part, and minimizing the compliance, stress, maximum mass, maximum deflection under load, or other intrinsic property of the part, and are used to drive the shape synthesis process towards better designs. Though not required, it is typical for a design objective to be rooted in a simulation of the design (linear static, fluid dynamic, electromagnetic, etc.). Design constraints can include a variety of physical characteristics or behaviors that must be met in any generated design (requirements, either on individual parts or on the entire assembly, are also admissible); examples include maximum mass, maximum deflection under load, maximum stress, etc.

Geometric constraints may also be provided, for example to ensure the generated shape has no tiny features or is more easily realized using a particular manufacturing process. Further, the geometric inputs to such a 3D geometry generation tool can include one or more user- or CAD system-provided "preserve bodies" (indicating a volumetric regions of the design space that should be filled in with material in a final design) or "preserve faces" (indicating an interface between the design space and an adjacent component that should be contacted by the generated 3D geometry) which should always be present in the design. The "preserve bodies" or "preserve faces" can represent interfaces to other parts of the systems or locations on which boundary conditions should be applied (for example, mechanical loads and constraints). Other regions in which geometry should or should not be generated can also be provided in a similar manner (e.g., "obstacle bodies" used to indicate where geometry should not be created). In some cases, the shape synthesis process takes place using a different representation of geometry than that employed by the CAD system. For example, a CAD system might use a boundary representation ("B-Rep") while the geometry generation engine might employ a level set function embedded in a voxel or tetrahedral mesh.

SUMMARY

This specification describes technologies relating to computer aided design of physical structures using techniques that facilitate manufacturing, such as generative design processes, in which the three dimensional (3D) models of the physical structures are produced so as to facilitate manufacturing of the physical structures using additive manufacturing systems and techniques by reducing (or eliminating) the support structure needed to manufacture the physical structure of a designed part.

In general, one or more aspects of the subject matter described in this specification can be embodied in one or more methods (and also one or more non-transitory computer-readable mediums tangibly encoding a computer program operable to cause data processing apparatus to perform operations), including: modifying, by a computer aided design program, a three dimensional shape of a modeled object, for which a corresponding physical structure is to be created using a manufacturing process, to produce a modified three dimensional shape of the modeled object, wherein the modifying includes, for each of two or more discrete layers of the three dimensional shape along a direction associated with the manufacturing process, extracting a two dimensional profile representation of the three dimensional shape in a current discrete layer, the two dimensional profile representation lying in a plane that is perpendicular to the direction associated with the manufacturing process, offsetting the two dimensional profile representation by an amount associated with the manufacturing process to form an offset two dimensional profile representation of the current discrete layer, and changing a next discrete layer using the offset two dimensional profile representation of the current discrete layer; and providing, by the computer aided design program, the modified three dimensional shape of the modeled object for use in manufacturing the physical structure using one or more computer-controlled manufacturing systems that employ the manufacturing process.

The manufacturing process can be an additive manufacturing process. In those cases, the direction is a build direction of the additive manufacturing process, and the offsetting includes offsetting the two dimensional profile representation inward by the amount, which is determined in accordance with a maximum overhang angle for the additive manufacturing process.

In some implementations, the method can include receiving the three dimensional shape of the modeled object, and wherein the modifying includes preparing the three dimensional shape of the modeled object for the additive manufacturing process The three dimensional shape can be a generatively designed three dimensional shape of the modeled object. The method can include: obtaining, by the computer aided design program, a design space for the modeled object, one or more design criteria for the modeled object; and iteratively varying, by the computer aided design program, a geometry of the generatively designed three dimensional shape of the modeled object in the design space in accordance with the one or more design criteria. The iteratively varying can include performing numerical simulation of the modeled object in accordance with a current version of the generatively designed three dimensional shape and at least one of the one or more design criteria to produce a current numerical assessment of the modeled object, updating the current version of the generatively designed three dimensional shape based on the current numerical assessment to produce an updated version of the generatively designed three dimensional shape of the modeled object, doing the modifying on the updated version to form a next version of the generatively designed three dimensional shape of the modeled object, and repeating at least the performing, the updating, and the modifying until a predefined number of shape modification iterations have been performed, the generatively designed three dimensional shape of the modeled object in the design space satisfies the one or more design criteria, or both.

The changing of the next discrete layer can include: performing a Boolean union of the offset two dimensional profile representation with the next discrete layer to produce a larger sized two dimensional profile for the next discrete layer; and adding geometry to the next discrete layer based on the larger sized two dimensional profile and a distance between the generatively designed three dimensional shape and a build platform for the additive manufacturing process. In some cases, the changing can include computing an exterior skeleton of the next discrete layer; producing a bridgeable two dimensional profile representation by inflating the exterior skeleton in accordance with a maximum bridging distance for the additive manufacturing process; subtracting the bridgeable two dimensional profile representation from the offset two dimensional profile representation to produce a bridged two dimensional profile representation; performing a Boolean union of the bridged two dimensional profile representation with the next discrete layer to produce a larger sized two dimensional profile for the next discrete layer; and adding geometry to the next discrete layer based on the larger sized two dimensional profile. In some implementations, the extracting can include using interpolation to construct the two dimensional profile representation from the three dimensional shape in the current discrete layer. In some implementations, the iteratively varying can include optimizing a topology of the three dimensional shape of the modeled object.

In some implementations, the updating of the current version of the generatively designed three dimensional shape based on the current numerical assessment to produce an updated version of the generatively designed three dimensional shape of the modeled object as part of the iteratively varying the geometry of the 3D shape can include that, for each location in the current version of the generatively designed three dimensional shape that has a surface angle which exceeds the maximum overhang angle for the additive manufacturing process: an amount of change indicated by the current numerical assessment at the location in accordance with the build direction is adjusted to lower the generatively designed three dimensional shape, with respect to a build platform for the additive manufacturing process, at the location; and the current version of the three dimensional shape is updated in accordance with the adjusting at each location. In some implementations, the adjusting can be performed in accordance with a scale factor, and the iteratively varying includes increasing, over multiple iterations of the iteratively varying, the scale factor from zero to a non-zero target value. In some implementations, the amount can be set by an allowed overhang angle, and the offsetting includes reducing, over multiple iterations of the iteratively varying, the allowed overhang angle from a first angle to the maximum overhang angle for the additive manufacturing process.

In some instances, the iteratively varying of the geometry of the generatively designed three dimensional shape of the modeled object in the design space in accordance with the one or more design criteria can include producing, for each of multiple iterations, the current version of the generatively designed three dimensional shape of the modeled object by mixing the next version of the generatively designed three dimensional shape from a prior iteration with the updated version of the generatively designed three dimensional shape from the prior iteration, wherein an amount of the next version used in the mixing increases relative to an amount of the updated version, in each of two or more subsequent ones of the multiple iterations.

In some implementations, the generatively designed three dimensional shape of the modeled object can include a level-set representation of an implicit surface of the modeled object, and the updating includes updating the level-set representation in accordance with shape change velocities computed for the implicit surface based on the current numerical assessment.

In some implementations, the providing the modified three dimensional shape of the modeled object for use in manufacturing can include: generating toolpath specifications for an additive manufacturing machine using the generatively designed three dimensional shape of the modeled object; and manufacturing at least a portion of the physical structure, or a mold for the physical structure, with the additive manufacturing machine using the toolpath specifications.

In some implementations, the manufacturing process includes a casting or molding process, the direction is a draw direction of the casting or molding process, and the offsetting includes offsetting the two dimensional profile representation outward by the amount, which is determined in accordance with a minimum draft angle for the casting or molding process.

In some implementations, the amount for offsetting the two dimensional profile can vary across the two or more discrete layers of the three dimensional shape.

In some implementations, the manufacturing process includes a molding process having two or more sides, the draw direction is a first draw direction of two or more draw directions corresponding to the two or more sides, the modified three dimensional shape of the modeled object is an output three dimensional shape of the modeled object, the extracting, offsetting and changing produces a first modified three dimensional shape. In those implementations, the modifying can include producing a second modified three dimensional shape by, for each of two or more discrete layers of the three dimensional shape along a second draw direction of the two or more draw directions, extracting a second two dimensional profile representation of the three dimensional shape in a second current discrete layer, the second two dimensional profile representation lying in a plane that is perpendicular to the second draw direction, offsetting the second two dimensional profile representation outward by the amount to form a second offset two dimensional profile representation of the second current discrete layer, and changing a second next discrete layer using the second offset two dimensional profile representation of the second current discrete layer; and performing a Boolean intersection of the first modified three dimensional shape and the second modified three dimensional shape to produce the output three dimensional shape of the modeled object.

In some implementation, the providing of the modified three dimensional shape of the modeled object for use in manufacturing includes saving the three dimensional shape of the modeled object to a permanent storage device for use in manufacturing the physical structure using the one or more computer-controlled manufacturing systems.

One or more aspects of the subject matter described in this specification can also be embodied in one or more systems including: a non-transitory storage medium having instructions of a computer aided design program stored thereon; and one or more data processing apparatus configured to run the instructions of the computer aided design program to perform any of the one or more methods described herein.

Particular embodiments of the subject matter described in this specification can be implemented to realize one or more of the following advantages. A generative design process can be adapted to produce shapes that are well suited to additive manufacturing, such as by targeting the overhang constraint and support considerations required for cost-effective additive manufacturing. By modifying the generated part design to reduce the amount of support structure that is needed, the additive manufacturing process for the part is made cheaper and simpler. A pair of filters (which operate on the generatively modeled shape differently) can be applied to an optimization procedure, where these filters encourage shapes that require less support structure by reducing the amount of geometry in the 3D model that violates an overhang constraint imposed by the additive manufacturing process to be used. The quality of the resulting shapes (from the generative design process) of the part, in terms of additive manufacturability, and the quality of the surfaces of those shapes on the part (after removal of any support structure used during additive manufacturing of the part) can be improved as compared to traditional approaches to overhang angle control in topology optimization. The modification of a 3D shape of an object can used to produce shapes that are well suited for other manufacturing processes, such as casting and molding processes. The modifications can be adjusted to fit into single-sided or multi-sided casting or molding processes to generate shapes that are easier to manufacture, are of high quality, and are associated with fewer resources for post-processing, among other examples.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
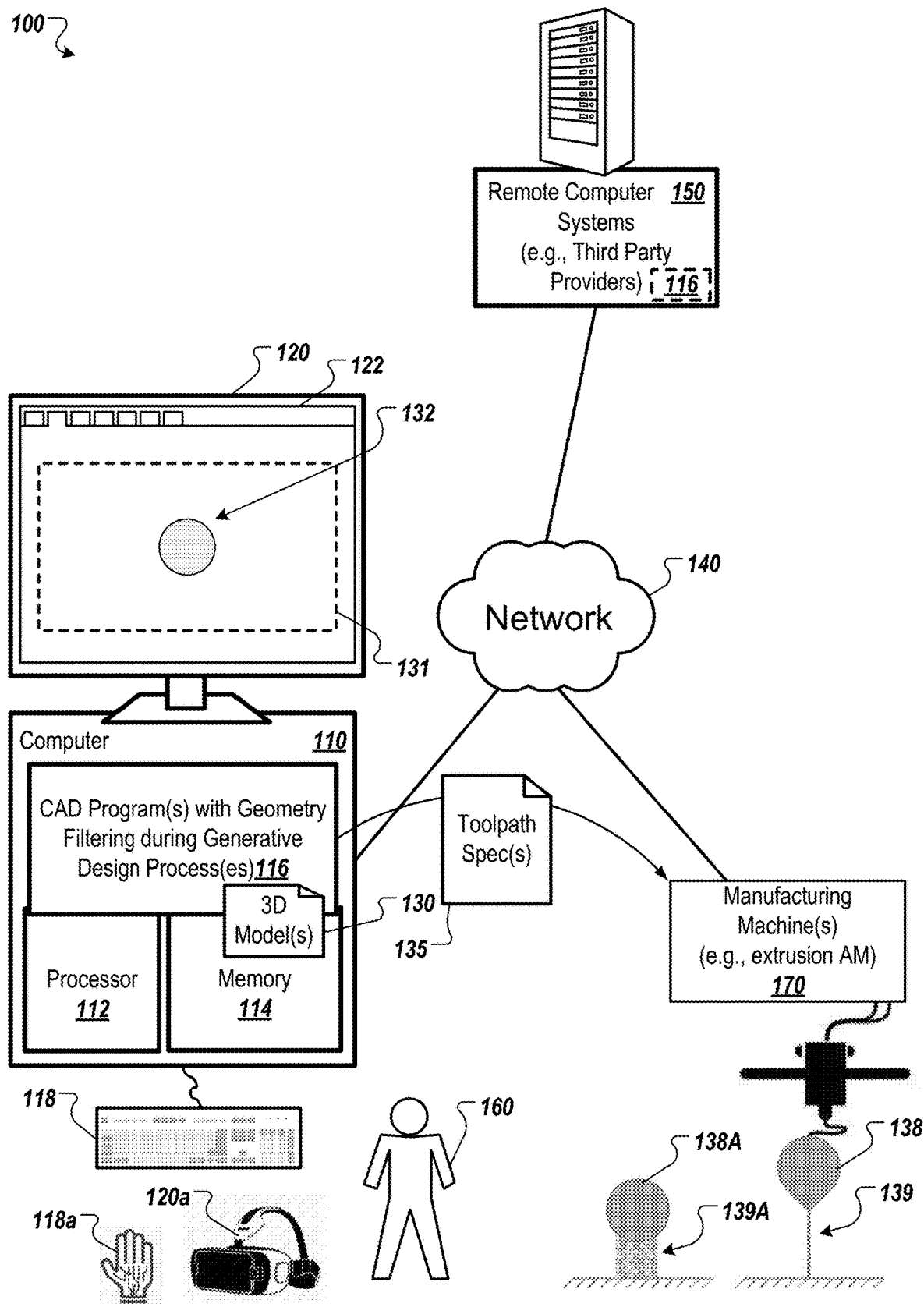
FIG. 1A shows an example of a system usable to perform geometry filtering and/or simulation results filtering during generative design to produce physical structures that are tailored to facilitate manufacturing using additive manufacturing, subtractive manufacturing, and/or other manufacturing systems and techniques.

FIG. 1A shows an example of a system usable to perform geometry filtering and/or simulation results filtering during generative design to produce physical structures that are tailored for manufacturing using additive manufacturing, subtractive manufacturing and/or other manufacturing systems and techniques. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes one or more generative design processes for topology optimization (e.g., using at least one level-set method as described) with or without numerical simulation and geometry filtering usable during the generative design processes.

In some instances, the numerical simulation performed by the systems and techniques described in this document can simulate one or more physical properties and can use one or more types of simulation to produce a numerical assessment of physical response (e.g., structural response) of the modeled object. For example, finite element analysis (FEA), including linear static FEA, finite difference method(s), and material point method(s) can be used. Further, the simulation of physical properties can include Computational Fluid Dynamics (CFD), Acoustics/Noise Control, thermal conduction, computational injection molding, electric or electromagnetic flux, and/or material solidification (which is useful for phase changes in molding processes) simulations. Moreover, the CAD program(s) 116 can potentially implement hole and/or fixture generation techniques to support clamping during manufacturing and/or manufacturing control functions.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or physical simulation operations) "to the cloud" by having one or more programs 116 on one or more computers 150 perform the offloaded processing operations. In some implementations, all generative design operations are run by one or more programs in the cloud and not in a shape representation modeler (e.g., B-Rep modeler) that runs on the local computer. Moreover, in some implementations, the generative design program(s) can be run in the cloud from an Application Program Interface (API) that is called by a program, without user input through a graphical user interface.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

An initial 3D model 132 can be an input to a generative design process. In some implementations, the starting shape (or "seed geometry") can include one or more preserve bodies. For example, the 3D model 132 can be various preserve bodies with boundary constraints defined with respect thereto, and the seed geometry for generative design can be formed as the convex hull of the preserve bodies 132; the input preserve geometry 132 can be unconnected modeled solids, where the generative design process is used to produce new 3D geometry that connects the input preserve solids. In general, a design space 131 for generative design can be obtained by determining a bounding volume or a convex hull for the input model 132, or another technique can be used to obtain the design space, which is the volume of space inside which the part is to be designed during topology optimization. In some cases, the user may explicitly specify the design space 131.

In some implementations, the user 160 can define a topology optimization problem for a generative design process to produce a desired 3D model from a starting 3D model, or the input can be a design space without a specific starting 3D model. In general, the input design space can be automatically generated or user specified. Note that the generative design process itself can produce starting geometry within the design space. One or more seed models can be used as input to the generative design process to introduce holes at the start of the shape evolution so as to modify the topology of the generative design.

In some implementations, a shape of a modeled object created using generative design processes or generative modeling can be improved for additive manufacturing by implementing an overhang angle filter to modify the shape to minimize support material required to be used to manufacture the part with an additive manufacturing tool (e.g., 3D printer). The modification of the 3D shape can adjust the placement of material in the manufactured part design to make it more self-supporting while reducing the regions requiring external support material during the additive manufacturing.

As described herein, the CAD program(s) 116 implement at least one generative design process, which enables the CAD program(s) 116 to generate one or more portions of the 3D model(s) (or the entirety of a 3D model) automatically based on design objective(s) and constraint(s), i.e., design criteria, where the geometric design can be iteratively optimized based on simulation feedback (e.g., based on a numerical simulation). In some instances, multiple 3D models can be co-created by one or more generative design processes and can be assembled to form a new 3D model. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources.

The design criteria can be defined by the user 160, or by another party and imported into the CAD program(s) 116. The design criteria can include a geometric objective that drives the shape (and optionally topology) evolution using an iterative numerical simulation process, with or without physics/physical response simulations. The design criteria can also include physics objectives of the evolution of the structure of the 3D model. For example, the geometric objective can correspond to a pseudo-physical response of the 3D model. In some implementations, the generative design process can be a structural generative design process that can be associated with boundary conditions, which can specify in-use load case(s) of the physical structure. In some instances, the boundary conditions can be pressure and velocity boundary conditions.

In some implementations, the design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use).

Various generative design processes can be used, which can optimize the shape and topology of at least a portion of the 3D model. The optimization of the geometric design of the 3D model(s) by the CAD program(s) 116 involves topology optimization, which is a method of light-weighting where the optimum distribution of material is determined by minimizing an objective function subject to design constraints (e.g., structural compliance with volume as a constraint). There are two primary categories of topology optimization, density-based approaches and boundary-based approaches. Density-based approaches discretize the volume of the part, and assign a density to each discrete cell, such as in a Solid Isotropic Material with Penalization (SIMP) method. Then the densities are driven toward solid and empty while minimizing the objective(s) subject to the constraints. Boundary-based approaches instead track the shape of the external interface of the solid part and move the boundary such that the constraints are satisfied and the objective(s) are minimized, such as in a level-set method.

As described herein, filtering during topology optimization can guide the generative design process to produce a final shape for the design that facilitates manufacture of the physical structure. Additive manufacturing is associated with considerations related to the effect of overhanging regions that require external support structure for performing the manufacturing. Designs that can be manufactured with minimal support structure are cheaper and easier to make. Reducing or eliminating overhanging regions which require external support structure is a consideration when defining a 3D shape of a model for manufacturing with an additive manufacturing process.

In some instances, such filtering can be performed based on an overhang angle optimization to improve the manufacturability of the final shape when provided for additive manufacturing. A designed object can be modified to adjust the 3D shape of the object to define a modified shape that reduces or eliminates overhanging regions that exceed an overhang angle associated with a given additive manufacturing process, which regions would otherwise require external support structure during that additive manufacturing process.

In some implementations, a generatively designed 3D shape of a modeled object has a level-set representation used during generative modelling of the object. The generatively designed 3D shape of the object can be varied using topology optimization to update the level-set representation in accordance with shape change velocities based on numerical simulation evaluation. A level-set representation method can be used to track the boundary of the shape of the modeled object during topology optimization, which has the advantages of providing precise knowledge of the boundary, and allowing topological changes as the surface evolves without the need for re-meshing. In any case, note that the shape synthesis process can (and often will) be done using a different representation of geometry than that employed by the CAD program(s) 116 for 3D modelling. For example, the CAD program(s) 116 can use a B-Rep model for the input geometry 132, while the geometry generation engine in the generative design process (e.g., in CAD program(s) 116) can employ a level-set function embedded in a voxel or tetrahedral mesh. Further details regarding the generative design process are provided below, such as in connection with FIGS. 1B, 2B, and 2C.

Once the user 160 is satisfied with a generatively designed 3D model, the 3D model can be stored as a 3D model document 130 and/or used to generate another representation of the model (e.g., toolpath specifications for a manufacturing process). This can be done upon request by the user 160, or in light of the user's request for another action, such as sending the generatively designed 3D model to a manufacturing machine, e.g., an additive manufacturing (AM) machine, such as an extrusion AM 170, or other manufacturing machinery, which can be directly connected to the computer 110, or connected via a network 140, as shown. This can involve a post-process carried out on the local computer 110 or externally, for example, based on invoking a cloud service running in the cloud, to further process the generated 3D model (e.g., based on considerations associated with the additive manufacturing process) and to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model for later use. For example, the CAD program(s) 116 can store the document 130 that includes the generated 3D model.

The CAD program(s) 116 can provide a document 135 (having toolpath specifications of an appropriate format) to the manufacturing machine 170 to create a complete structure 138 from stock material, where the physical structure 138 includes the optimized topology and shape that facilitates manufacturing, for example, additive manufacturing, as shown. Additive manufacturing includes converting a digital design into a physical part, for example, through incremental addition of material inside a build volume under computer control. In some additive manufacturing processes, the material can be added layer-by-layer, starting from the bottom of the part and working upward.

In some implementations, the manufacturing machine 170 can include a subtractive machine that can perform a subtractive manufacturing process that typically begins with a solid block of stock material and gradually removes material from the stock. One of the common subtractive approaches is milling, which uses rotary cutters or routers, also known as "tools" or "bits", to remove the material. The milling process can limit the types of shapes that can be manufactured because the milling machine must be able to hold the part rigidly and the rotary bit must be able to access the material surface without interference. Other important considerations that should to be taken into account are vibration of the part during material removal and stresses on the bit itself by the milling process.

In some implementations, a generated 3D model at the CAD program 116 can be initially provided for additive manufacturing to one manufacturing machine of the manufacturing machines 170 and subsequently to a subtractive machine for performing post processing on the structure created by the additive manufacturing. Different 3D models for a single object can be available to manufacture a part using additive manufacturing. The different 3D models can be associated with different requirements for support material for performing the additive manufacturing and overcoming the overhanging angle limitation of the additive manufacturing. In some implementations, a 3D model can be generated to minimize the need for external support material (i.e., additional structure produced external to the manufactured object, in order to support the object, based on the 3D model of the object) by incorporating in the design of the 3D model additional material (by modifying the shape of the object by applying a geometry overhang angle filter) that can provide self-support for the manufactured object based on the generative designed 3D model. Such self-support can reduce or even eliminate the need for external support material.

For example, in the case of a round beam 132 to be manufactured as physical structure 138A, external support structure 139A will be required since the beam (shown in cross-section in FIG. 1A) overhangs the build plate used during additive manufacturing. One way to reduce the amount of support structure 139A is to lower the beam to be closer to the build plate. This reduces the volume of external support structure 139A, but could also impact the performance of the design if enforced too stringently during the generative design process. Nonetheless, providing a filter that tends to lower the part design during generative design modeling helps in reducing external support material requirements.

Another way to reduce the amount of support structure is to change the beam's cross-section to minimize the size of the region that violates the overhang angle. As shown, the physical structure 138 has been reshaped to look (in cross-section) like a balloon (or inverted tear-drop) rather than a ball, which reduces the overall volume of external support structure 139 significantly. Moreover, it should be noted that the contact area between the part 138 and the support structure 139 is also significantly reduced. This provides advantages when it comes to removing the external support structure 139 after the additive manufacturing process is completed, as there are both fewer areas where the support structure 139 needs to be detached, and after detachment, there is less surface area of the part 138 that may need to be further processed (e.g., use of a finishing, subtractive manufacturing process to remove burs and imperfections at the points of detachment). Examples of processes for applying this inverted teardrop-shaped cross-section to beams and other structures is described in further detail below.

Figure 1B:
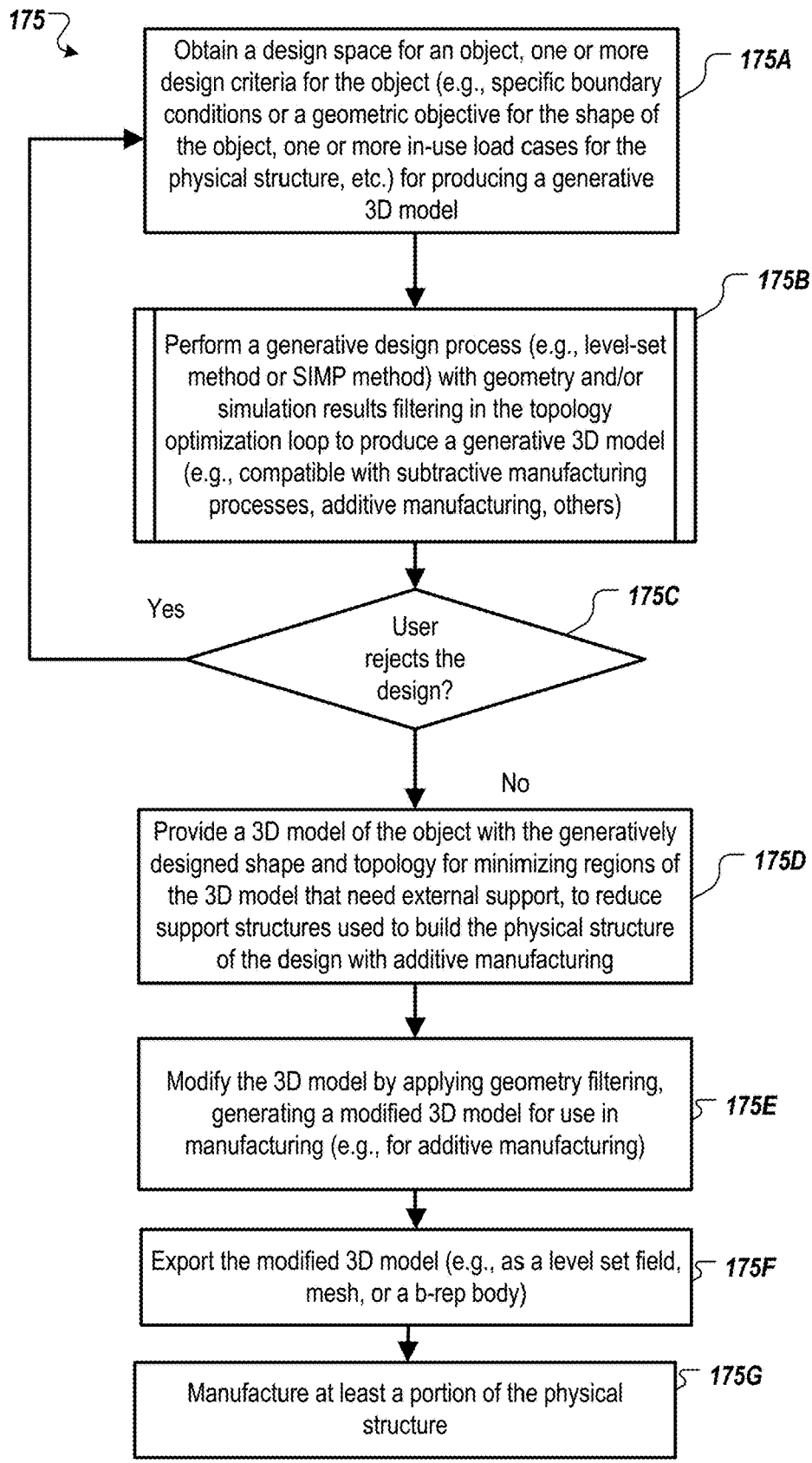
FIG. 1B shows an example of a process of generative design with geometry filtering that is tailored for manufacturing physical structures using an additive manufacturing process.

In various implementations, the CAD program(s) 116 of the system 100 can implement one or more generative design processes as described in this document. Generative design processes seek an optimal geometric shape, topology, or both. For example, generative design processes seek an optimal geometric shape among alternative designs by minimizing a performance-related objective function subject to constraints:

$$\text{minimize } J(s,u(s)) s \in \mathbb{R}^{n_s} \tag{1}$$

$$\text{such that } g_i(s,u(s))=0 \; i=1,\ldots,n_g \tag{2}$$

where s is a vector of design variables related to a geometric shape of the domain, and u is a vector of state variables (e.g., displacement) that depend on s. Additional constraints (e.g., equilibrium) are denoted by a set $g_i$. For simplicity, equality constraints are assumed here. Mathematical programming methods used to minimize Equation (1) can be gradient-based or non-gradient-based. Gradient-based methods (versus non-gradient-based methods) generally use more information associated with design sensitivity, for example:

$$\frac{dJ}{ds}(s, u(s)) = \frac{\partial J}{\partial s} + \frac{\partial J}{\partial u}\frac{du}{ds} \tag{3}$$

which is a derivative of the performance-related objective function with respect to the design variables. In level-set based topology optimization methods, s represents a boundary of a solid region. FIG. 1B shows an example of a process 175 of generative design with geometry filtering that is tailored for manufacturing physical structures using an additive manufacturing process. At 175A, a design space for an object including one or more design criteria can be obtained by a CAD program such as the CAD program(s) 116 of FIG. 1A, for use in producing a generative 3D model. The design space for the modeled object is the volume inside which the part is to be designed. The design space can include a bounding volume containing an initial specification of one or more outer shapes of the 3D topology for the object. As noted above, the design space can include 3D model(s), designed in or loaded into the CAD program(s) 116, that serves as a sub-space of an optimization domain of a described generative design process, and/or a set of input solids, e.g., preserve bodies, used to specify boundary conditions for generative design geometry production, e.g., B-Reps selected, for example, by a user through a user interface, such as the UI 122 to specify sub-space(s) that are preserved for use as connection point(s) with other component(s) in a larger 3D model or separate 3D model(s).

The design criteria can include design objective(s) and design constraint(s) for the object. Design objectives can include but are not limited to minimizing waste material, minimizing the weight of the part, and minimizing the compliance, stress, or other intrinsic property of the part, and are used to drive the shape synthesis process towards better designs. Though not required, it is typical for a design objective to be rooted in a simulation of the design (linear static, fluid dynamic, electromagnetic, etc.). Design constraints can include a variety of geometric and physical characteristics or behaviors that should be met in any generated design (requirements either on individual parts or on the entire assembly are also admissible); examples include maximum mass, maximum deflection under load, maximum stress, etc.

The design criteria can also include geometric objectives for the shapes and geometric constraints. The geometric constraints can be provided by a user or from the CAD program(s) 116 to ensure certain characteristics of the shape to provide a shape that is easier to manufacture. For example, the geometric constraints can be defined to ensure that the generated shape can have no tiny features. The input geometry can include details for "preserve bodies" that should be present in the design as representing interfaces to other part of the system, or identify locations on which boundary conditions should be applied (e.g., mechanical loads and constraints).

Further, different generative design processes can be formulated by using different combinations of design parameters and design variables. In some implementations, the design parameters can include various types of inputs, received through UI 122, such as selection among different generative design synthesis methods made available by CAD program(s) in the system 100. In some implementations, the available generative design synthesis methods can include a level-set-based topology optimization that provides a basic level-set method for topology optimization. Other generative design synthesis methods are also possible and can be provided by CAD program(s) in the system 100. Different combinations of design parameters and design variables can be used, e.g., by CAD program(s) 116 in response to input from the user 160. For example, a user 160 may select different generative design synthesis methods to use within respective different design spaces within a single 3D model.

Further, the obtained 175A one or more design criteria can include one or more in-use load cases (e.g., one or more boundary conditions that specify one or more in-use load cases) for the physical structure to be manufactured from the generatively designed part. The one or more in-use load cases can be associated with a setup for numerical simulation, e.g., densities of elements in an FEA model to be used with an optimized 3D topology of the part being generatively designed. However, as used herein, "in-use load cases" refer generally to separate groups of loads and constraints under which part performance is evaluated and correspond to sets of boundary conditions for various types of physics simulations, such as fluid flow simulation, electro-magnetic (EM) behavior simulation, multiphysics simulation, etc. Thus, various types of boundary conditions, e.g., pressure and/or velocity boundary conditions, can be used.

In general, the setup for numerical simulation can include one or more physical properties to be simulated and one or more types of simulation to be performed, as well as potentially surrogate modelling or other methods of approximation. In some implementations, the type of numerical simulation is predefined, either for all uses of the program or given a particular context in the program from which the generative design process has been launched. Further, the setup for numerical simulation can include at least one set of loading conditions and/or other physical environment information associated with the type of numerical simulation to be performed.

With the generative design space and design criteria specified, one or more 3D model(s) can be produced, at 175B, e.g., by CAD program(s) 116, using one or more generative design processes. In some implementations, the produced 3D model(s) can be designed for use in additive manufacturing, subtractive manufacturing (e.g., manufactured using a 2.5-axis subtractive manufacturing process), and/or other manufacturing systems and techniques.

The one or more generative design processes performed, e.g., by CAD program(s) 116, can include a boundary-based generative design process (e.g., using a level-set method) of topology optimization, a density-based generative design process (e.g., using a SIMP method), or both. In some implementations, the one or more generative design processes can use the described level-set methods, where s, from equations (1), (2) and (3), represents a boundary of a solid region that is implicitly represented using one or more level-sets, which can be stored as sampled values on a background grid or mesh. A signed distance field is an example of such a level set function, where the zero-contour represents the shape boundary, positive values of the function correspond to points exterior to the material domain and quantify the distance between the point and the nearest domain surface, and negative values correspond to points interior to the material domain and quantify the distance between the point and the nearest domain surface. In a level-set-based topology optimization method, the outer shape of a structure is represented by a contour of the level set function, and a change in shape and configuration is represented by a change in the level set function value.

In any case, the production 175B of the 3D model(s) involves iteratively modifying, e.g., by CAD program(s) 116, a generatively designed 3D shape of the modeled object. This includes modifying both a geometry of the 3D shape (e.g., with SIMP or level-set methods) and a topology of the 3D shape (e.g., adding holes or voids to modify the spatial properties of the surface that are unaffected by continuous deformation without tearing, thus changing how shape elements are bounded and connected in the 3D model). In some implementations, the production 175B of the 3D model(s) can employ geometry filtering and/or simulation results filtering (as described in detail in this document) in the topology optimization loop to produce one or more generative 3D models with reduced or eliminated requirements for external support structure.

The result of generative design processing can be presented to the user, e.g., in UI 122 on display device 120, along with an option to accept or reject the design. The option to accept or reject the design can be provided at 175C. For example, a 3D model produced by the generative design processing can be presented to the user 160 in UI 122. In some implementations, the user can select from the final design or any of a variety of previous iterations for each design study. In some implementations, two or more 3D models resulting from the generative design process can be presented to the user along with trade-off analysis of design complexity versus cost of manufacturing, e.g., based on the amount of external support structure that will be needed, or any of a variety of other quantities of interest. The trade-off analysis can assist a user 160 to accept or reject one or more 3D models among the presented 3D models.

If the design is rejected, the process of FIG. 1B can return to obtain 175A, e.g., by CAD program(s) 116, new design space and/or new design criteria for use in producing a new generative 3D model. Once a design is not rejected 175C, the process of FIG. 1B can provide 175D, e.g., by CAD program(s) 116, the 3D model of the object with the generatively designed shape and topology having reduced external support structure requirements for building the design with additive manufacturing. In some instances, a designed model can be further post-processed to be adjusted to improve additive manufacturing by requiring less support structure. In other words, the filtering described in this document can be performed during the shape optimization loop of the generative design process and/or after the generative design process finishes.

At 175E, a modified 3D model is generated by applying a geometry filter. The geometry filter can implement an overhang angle filter that improves the additive manufacturability of the shapes created using generative design processes (e.g., at 175B) in a post-process (as shown) and/or the geometry filter can be applied 175E within the iterative optimization loop of the generative design process 175B. In either or both cases, the 3D model is modified to reduce or eliminate the regions that require external support structure as described throughout this disclosure. The modification can be performed as described for method 200 of FIG. 2A. Note that the 3D model that is provided, at 175D, can be the 3D model produced 175B by a generative design synthesis method and/or a post-processed version of the generative design output at 175B. Thus, the modifying 175E can be included in the generative design processing 175B and/or in the providing 175D.

At 175F, the modified 3D model can be exported in an output format. For example, the 3D model that has been modified 175E in the generative design process 175B can be exported as a level set field, polygonal mesh, or a B-Rep body (with the aid from a Mesh-to-B-Rep technology for the conversion), among other examples. In some implementations, a polygon mesh, which can be extracted from the output by a boundary-based generative design process, or generative design data obtained directly from the boundary-based generative design process can be converted into a boundary representation (B-Rep) model and/or a parametric feature model, e.g., by CAD program(s) 116. For example, generative design data can be level-set distance field data obtained directly from the boundary-based generative design process. The boundary representation model or the parametric feature model can be editable as sketch geometry and parametric features. In some implementations, a 3D mesh model produced by a generative design synthesis method can be converted into a watertight B-Rep 3D model, before being provided 175D.

At 175G, the exported model is used for manufacturing at least a portion of the physical structure. In some implementations, the toolpath specifications for an additive manufacturing machine are generated 175G for at least a portion of the generatively designed three dimensional shape of the modeled object, and at least a portion of the physical structure (or a mold for the physical structure) is manufactured 175G with the additive manufacturing machine using the toolpath specifications. Moreover, as with the modifying 175E, both the exporting 175F and the manufacturing 175G can be included in the providing 175D.

Figure 1C:
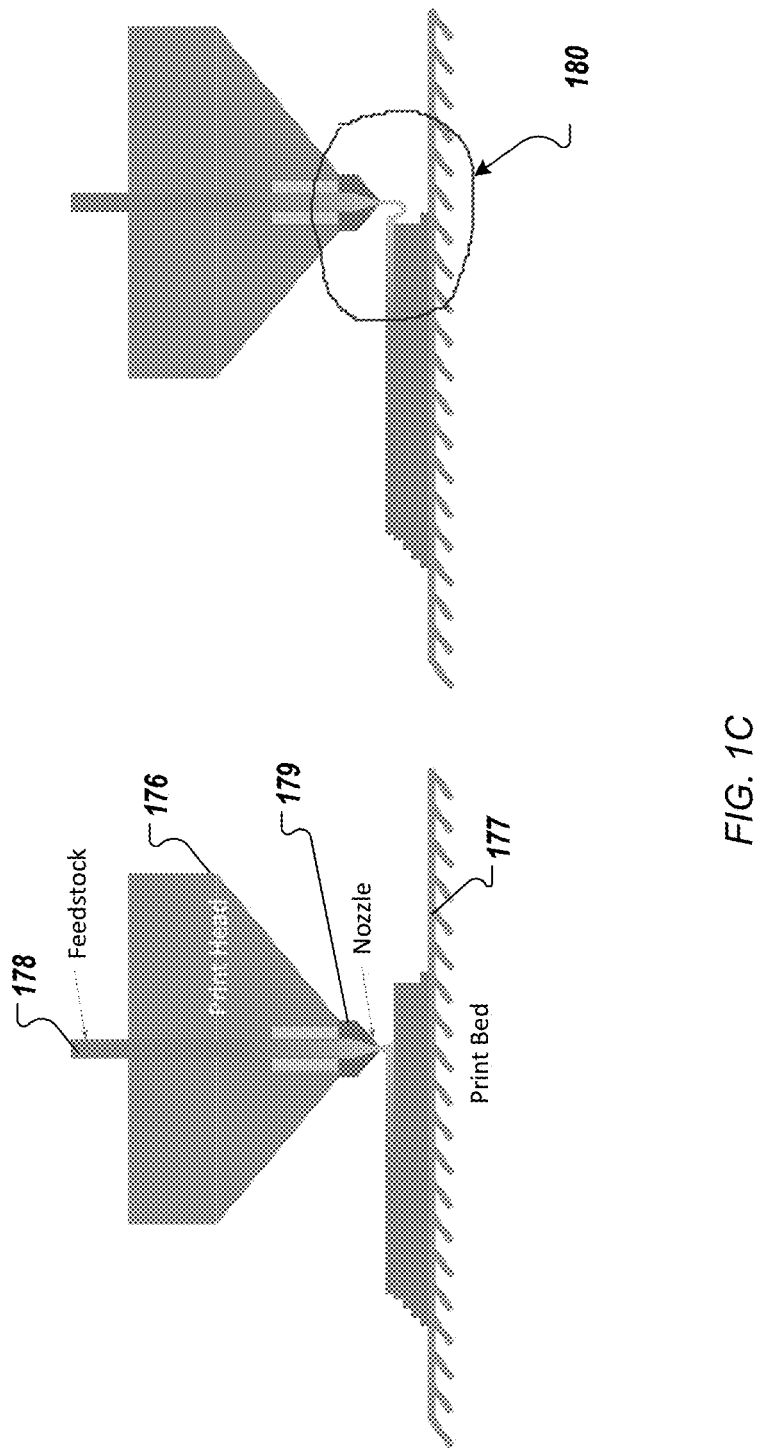
FIG. 1C shows an example of a process of fused filament fabrication that is associated with overhanging "drooping" challenges.

Additive manufacturing can be associated with challenges to manufacture shapes that include regions which have no material directly beneath them ("unsupported" or "overhanging" regions). To avoid defects, such regions are made manufacturable by an addition of external support materials, which are sacrificial geometry manufactured under the unsupported regions, whose primary purpose is to mechanically support a next layer during additive manufacturing performed layer-by-layer. For example, FIG. 1C shows an example of a process of fused filament fabrication that is associated with overhanging "drooping" challenges.

Fused filament fabrication process is an example additive manufacturing process that is associated with challenges when producing a part in which material is added layer-by-layer, starting from the bottom of the part and moving upward to feed material. In this process, a printer or other additive manufacturing tool includes an initially empty print bed 177 and a numerically controlled print head 176. The print head 176 receives a feedstock filament 178 that is momentarily melted and squeezed out through a nozzle. As the filament cools, it bonds to material (such as previously laid down filament of the part) or supporting structures (e.g., the print bed 177 or artificially added support structure outside of the design of the part) that is beneath and adjacent to the extruded material. Because the filament is in liquid form when it leaves the nozzle 179, if there is nothing (or approximately nothing) directly beneath the filament when it falls from the nozzle 179, the filament is going to droop as it is presented at 180.

When a part is manufactured, the print bed can serve as a support structure on which the filament is deposited. On subsequent layers, if there is material from a previous layer directly beneath a currently deposited layer, the filament is supported by the previous layer. To avoid defects, during process planning, regions which have no material directly beneath them ("unsupported" or "overhanging" regions) are made manufacturable by the addition of a support material, which is sacrificial geometry manufactured under the unsupported regions. The support material can be used to mechanically support a new subsequent layer that is disposed from the print head 176.

The support material is a support structure that is not part of the manufactured physical object as the support materials is not included in the 3D model of the physical object (i.e., the support material/structure is external to the physical structure defined by the 3D model). The support material is an external structure that is designed to support an already defined object that is provided for manufacturing based on a generated 3D model. Such support material can be removed after the additive manufacturing. In contrast, the object can be designed to include a portion (internal to the 3D model design) that modifies the physical structure of the modeled object (i.e., the supporting portion is defined in the 3D model of the physical object) to facilitate manufacturing of the physical object by an additive manufacturing process.

Thus, a 3D model of an object (generated with a generative design process as described throughout this document) can be adjusted or modified to minimize regions in the modeled shape which require external support structures, and thus reduce (or eliminate) the amount of external support material needed to produce the design with additive manufacturing. Such minimization in the regions in the modeled shape can be associated with fewer resources spent for post processing work on the manufactured object after the additive manufacturing, e.g., less finishing work after the external support structure is detached. Moreover, such minimization can be associated with fewer resources spent to design, prepare and provide external support structures for the additive manufacturing. Thus, the additive manufacturing process is improved by modifying the 3D shapes that are used for manufacturing physical objects with additive manufacturing. In short, the 3D model can be modified (during and/or after generative design) to help make the physical object be more self-supporting during manufacturing, e.g. during 3D printing, molding, or casting.

Figure 1D:
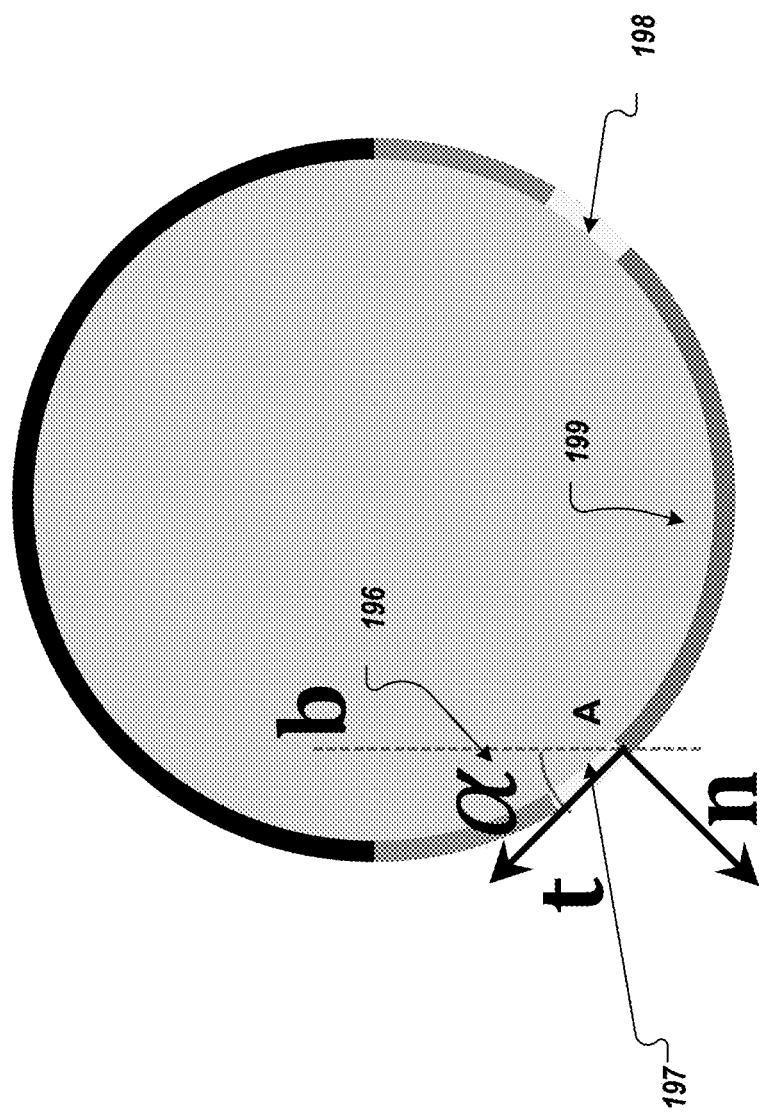
FIG. 1D shows an example of overhang angle related to surface normals and a build direction of an additive manufacturing process.

FIG. 1D shows an example overhang angle related to surface normals and a build direction of an additive manufacturing process. Typically, there is a maximum overhang angle, above which external support material is required to ensure successful manufacturing. In the example of FIG. 1D, the overhang angle is identified as a 196. In general, the overhang angle relates a surface normal on the part to a build direction being used for that part. The maximum overhang angle is the largest overhang angle, which can be manufactured using a given additive process.

The overhang angle α 196 can be defined as an inclination of a build face (or wall, surface) of the part from a vertical axis that corresponds to the build direction b. The overhang angle α 196 is determined at point A of the surface of a 3D shape of the part that is used for manufacturing with the additive manufacturing process. As shown on FIG. 1D, t identifies a tangent line at point A and the overhang angle is defined between the tangent line and the build direction b. The surface normal is identified with n. In the shown example, the sections 197 and 198 (light-grey shaded) correspond to areas where support structure is likely needed, and the section 199 (mid-grey shaded) defines a region of the shape that certainly requires support structure for manufacturing the part. Note that the example of FIG. 1D is in two dimensions for ease of presentation, but in three dimensions, there is a plane full of tangent lines perpendicular to the surface normal n, and the tangent line (from these different tangent lines in the plane perpendicular to n) is the line that forms the smallest angle with the build direction b. Further, an equivalent way to define the overhang angle is 90°-<n,b>, where <n,b> is the smaller angle between n and b.

Figure 2A:
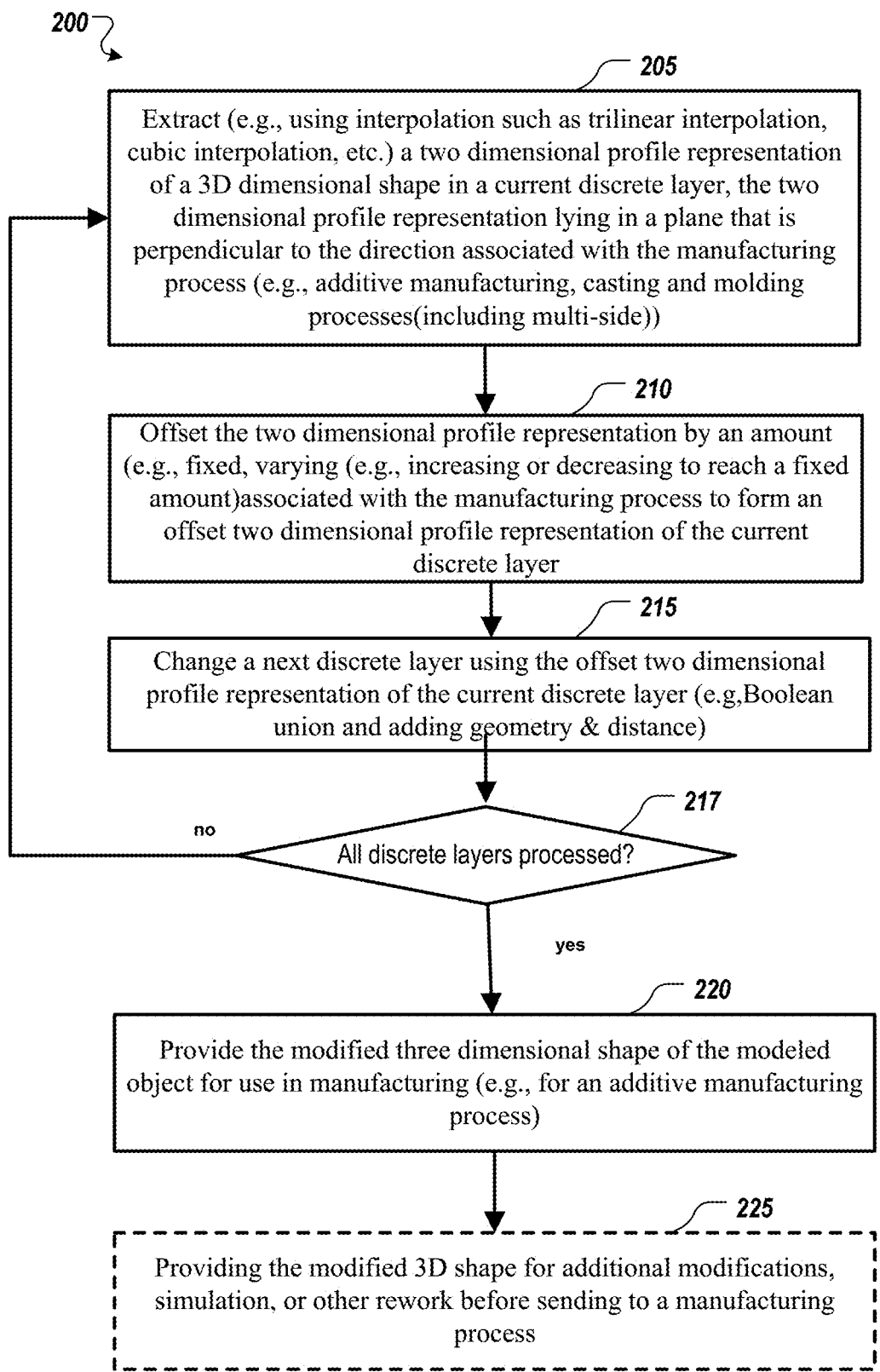
FIG. 2A shows an example of a process for modification of a generative design based on geometry filtering to produce a new 3D model of a part that reduces (or eliminates) the support structure needed to manufacture the physical structure of the designed part during an additive manufacturing process.

FIG. 2A shows an example of a process 200 for modification of a generative design based on geometry filtering to produce a new 3D model of a part that reduces (or eliminates) the support structure needed to manufacture the physical structure of the designed part during an additive manufacturing process. The process of FIG. 2A is an example of the process of modification at 175E of FIG. 1B. Thus, the process of FIG. 2A can be performed after the generative design process 175B and/or within the generative design process 175B during iterative modification of the generatively designed 3D shape, e.g., using topology optimization. In any case, the modified 3D shape of the modeled object facilitates manufacturing a physical structure for the 3D model by requiring less (or eliminating) external support structure during additive manufacturing. The process 200 can be executed by a CAD program similar to the CAD program(s) 116 of FIG. 1A. The modification of the 3D shape can be performed for each discrete layer of the 3D shape, where the discrete layers can be defined along a direction associated with the manufacturing process (e.g., the build direction of an additive manufacturing process). Thus, the discrete layers can be defined according to the orientation of the object with respect to the build plate on which the modeled object will be manufactured. In some implementations, the modification can be performed starting from higher discrete layers to lower discrete layers in the volume along the negative AM build direction.

Figure 3:
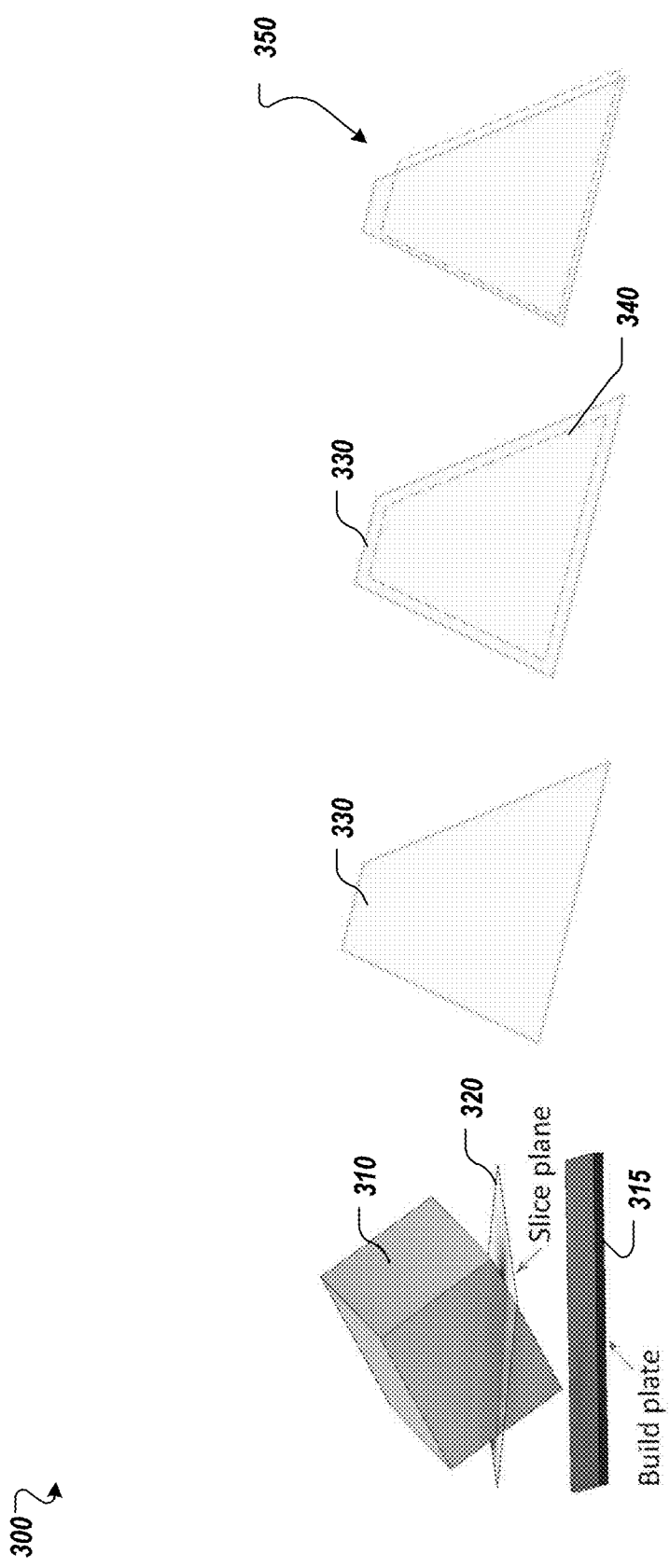
FIG. 3 shows an example of a process for modifying a 3D shape of a modeled object in layers by offsetting profile representations in discrete layers of the three-dimensional shape that are defined along a direction associated with the manufacturing process to encourage production of a 3D model compatible with additive manufacturing processes.

The process 200 can be executed to modify a generative design of a cube based on described filtering herein, as shown on FIG. 3. At 205, a two dimensional profile representation of a 3D shape in a current discrete layer is extracted. The two dimensional profile representation lies in a plane that is perpendicular to a direction associated with the manufacturing process. The 3D shape includes at least two discrete layers. If the manufacturing process is additive manufacturing process, the direction is the build direction of that process.

At 210, the two dimensional profile representation is offset by an amount associated with the manufacturing process to form an offset two dimensional profile representation of the current discrete layer. In some implementations, when the 3D shape is modified to improve its manufacturability, the offsetting can include offsetting the two dimensional profile representation inwards by the amount that is determined in accordance with the manufacturing process. In some instances, the 3D shape may be modified for use in additive manufacturing. In other instances, the 3D shape may be modified for use in casting or molding processes. In the case of additive manufacturing, the discrete layer can be determined according to the build direction, and the offsetting of the two dimensional profile representation inwards can be by an amount that is determined according to a maximum overhand angle for the additive manufacturing process. In the cases of casting or molding processes, the discrete layers can be determined according to a draw direction (as presented on FIG. 9) of the casting or the molding processes, and the offsetting of the two dimensional profile representation outwards can be by an amount that is determined in accordance with a minimum draft angle for the casting or the molding processes.

In some implementations, the additive manufacturing of a part can be performed with different materials. Since different materials can have different physics characteristics (e.g., different viscosities and stickiness of the material when in melted form), different materials can likewise have different overhang angles. In some instances, different manufacturing processes (FFF, SLA, SLM, etc.) can affect the determination of an overhang angle, and thus can be associated with different overhang angles. In some instances, the process conditions (e.g., melt temperature in FFF) can be a factor affecting the determination of the overhang angle.

At 215, a next discrete layer is changed using the offset two dimensional profile representation of the current discrete layer. The next discrete layer can be determined as a subsequent layer swept from a top layer to a bottom layer, where the layers are swept in the opposite direction of the build direction.

In some implementations, the changes to the next discrete layer can be done by performing a Boolean union of the offset two dimensional profile representation of the current discrete layer with the next discrete layer to produce a larger sized two dimensional profile for the next discrete layer, and geometry is added to the next discrete layer based on the larger sized two dimensional profile. Note that while layers are iteratively changed, the size of any given layer may not be changed in cases where the additive manufacturing process does not require support for the layer above that given layer, or in cases where the draft angle for a casting or molding process is not violated between the given layer and the layer below it.

In some implementations, when a layer is changed, bridging considerations can be taken into account when performing the changes to the geometry to produce a shape that allows a small region of overhanging geometry to be present when connecting two self-supporting beams of a face. When changing the next discrete layer during modification of a 3D shape, an exterior skeleton of the next discrete layer can be computed. Based on the exterior skeleton, a bridgeable two dimensional profile representation can be produced by inflating the exterior skeleton in accordance with a maximum bridging distance for an additive manufacturing process that is to be used for the manufacturing of the modeled object. The bridgeable two dimensional profile representation can be subtracted from the offset two dimensional profile representation to produce a bridged two dimensional profile representation. A Boolean union of the bridged two dimensional profile representation can be performed with the next discrete layer to produce a larger sized two dimensional profile for the next discrete layer. Geometry can be added to the next discrete layer based on the larger sized two dimensional profile. Further details related to additive manufacturing with or without bridging consideration are described in relation to FIG. 8.

At 217, it is determined whether all the discrete layers of the 3D shape are processed. If it is determined that not all layers are processed, the process 200 proceeds to 215 and iterates on a next identified layer by executing the operations 205, 210, and 215. Thus, the operations 205, 210, and 215, are iteratively performed to process each of the discrete layers of the 3D shape. Once it is determined that all the layers of the 3D shape have been processed to change each lower layer based on the offset two dimensional profile of the layer above it, at 220, the modified 3D shape is provided for use in manufacturing.

In some implementations, the modified 3D shape can be also provided for additional modifications, simulations or other rework processes, before it is sent for use in manufacturing. The additional processing can be performed at the CAD program associated with the performed generation of the modified 3D shape, or externally. The additional processing can be based on further user input for modifications of the generated 3D model. Further, the modified 3D model can undergo simulation procedures and evaluations as described in this document to adjust, modify, and/or improve the 3D model based on a defined simulation criteria that can be associated with the working material, and the manufacturing process, among other examples.

In some implementations, the modified 3D shape can be provided for generation of toolpath specifications for an additive manufacturing machine to use the generatively designed 3D shape of the modeled object. At least a portion of the physical structure (or a mold for the physical structure) can be manufactured with the additive manufacturing machine using the toolpath specifications. Further, the modified 3D shape can be provided for saving to a permanent storage device for use in manufacturing the physical structure using the one or more computer-controlled manufacturing systems.

Figure 2B:
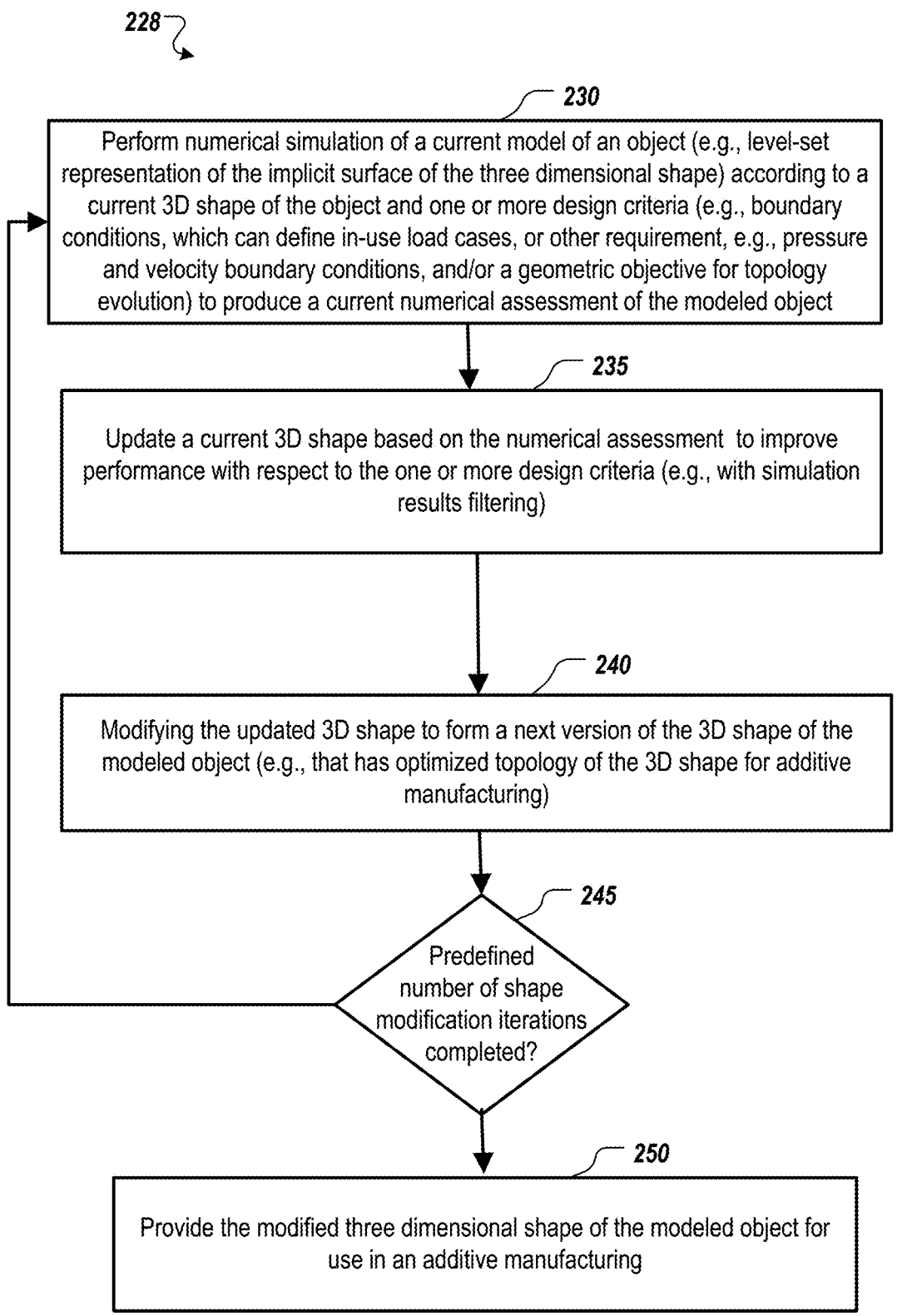
FIG. 2B shows an example of a process for providing a 3D shape of a modeled object that is modified through successive iterations of an optimization loop to produce an optimized design according to one or more constraints (e.g., mass, max stress, and manufacturability) that is suitable for optimization for manufacturing a physical structure with an additive manufacturing process.

FIG. 2B shows an example of a process 228 for providing a 3D shape of a modeled object that is modified through successive iterations of an optimization loop to produce an optimized design according to one or more constraints (e.g., mass, max stress, and manufacturability) that is suitable for optimization for manufacturing a physical structure with an additive manufacturing process.

The process of FIG. 2B is an example of the defined process 175B from FIG. 1B. Thus, the process 228 includes performing of iterative modification of a generatively designed 3D shape, using a specified generative design process based on input including a design space, a numerical simulation setup, and one or more design criteria, as detailed above. In some implementations, the shape synthesis process employs a boundary based (e.g., a level-set) method of shape optimization that begins with a starting shape or seed geometry, which is then modified through successive iterations of an optimization loop to produce an "optimized design" that minimizes some quantity of interest (e.g., strain energy) subject to some constraints (e.g., mass, max stress, and manufacturability).

Such modified design can be then further modified based on a geometry filtering to produce a new 3D model that reduces (or eliminates) the support structure needed to manufacture the physical structure of the designed part during an additive manufacturing process. Such further modifications to tailor the 3D model for use in additive manufacturing with reduced support structure requirements can be performed as described for process 200 from FIG. 2A.

The shape optimization loop as presented on FIG. 2B includes iterative varying of a geometry of 3D shape of a modeled object in a design space and in accordance with design criteria.

At 230, numerical simulation is performed for a current model of an object (e.g., level set representation of an implicit surface of a 3D shape) according to a current 3D shape of the object and one or more design criteria. The design criteria can include boundary conditions that can define in-use load cases or other requirements (e.g., pressure and velocity boundary conditions, a geometric objective for topology evolution), to produce a current numerical assessment of the modeled object. The current numerical assessment can be for the physical response (e.g., structural response) of the modeled object. As noted above, various types of numerical simulation can be performed. For example, an FEA simulation can compute strain energy everywhere inside the volume of the current version of the 3D shape. In any case, physics simulation of the current 3D shape produces a current numerical assessment that can then be used to change the 3D shape in view of the design criteria.

In response to the performed numerical simulation, the current 3D shape is then updated, at 235. The update is based on the current numerical assessment. In some implementations, the generatively designed 3D shape of the modeled object includes a level-set representation of an implicit surface of the modeled object, and the updating 235 includes updating the level-set representation in accordance with shape change velocities computed for the implicit surface based on the current physical assessment. For example, the strain energy field inside the volume (as determined by the numerical simulation) can be transformed into a velocity field on the surface of the volume, where the velocity at each point moves the geometry towards a more optimal shape, and the 3D shape can be advected to update the shape by moving each piece of the boundary according to its velocity.

Various types of updating 235 processes can be used. For example, the update 235 can include performing simulation results filtering, as detailed below in connection with FIG. 4. Further, the 3D shape of the modeled object can be represented in different formats during different processing stages, such as representing the 3D shape using a grid of cubic voxels for simulation, using an implicit shape for shape update, and using a polygonal mesh for export of the generative design.

The updated 3D shape (at 235) is provided, at 240, for modification to form a next version of the 3D shape of the modeled object. The modification 240 can be for optimizing the topology of the 3D shape for additive manufacturing. In some implementations, the modification is applying a geometry filter on the 3D shape to offset profiles from layers of the shape by a predefined amount associated with the additive manufacturing process to define a new 3D model that can support production of a physical structure with additive manufacturing techniques that require fewer support structure as described throughout this document. The modification 240 can be the same as, or substantially similar to, the executed operation 205, 210, 215, and 217 of process 200 of FIG. 2A. The modification at 240 is performed to change the 3D shape to facilitate additive manufacturing by reducing (or eliminating) external support structure for performing the manufacturing. The modified model that is generated through the optimization loop (operations 230, 235, and 245) can be with improved shape (and optionally topology) to meet design criteria and also to be more self-supporting by reducing the needed support structure for manufacturing using an additive manufacturing tools.

After each iteration of modification is completed (an iteration of the processing going through the operations 230, 235, and 240), at 245 it can be evaluated whether the number of processed iterations corresponds to a predefined number of shape modification optimizations to be completed. Additionally or alternatively, at 245 it can be evaluated whether the 3D shape that is generatively designed meets the design criteria for defining the 3D shape (convergence). If the predefined number is not reached and/or the current model has not converged to a stable solution meeting the design criteria, the method 228 can proceed with a subsequent iteration for performing the operations 230, 235, and 240. Once the predefined number of iterations is completed and/or the 3D model has converged to a stable solution meeting the design criteria, then, at 250, the modified 3D shape of the modeled object is provided for use in manufacturing, e.g., additive manufacturing. In some instances, the optimization of the 3D shape can be stopped in cases where the modifications do not change (or do not significantly change) the 3D shape.

The modified model generated through the loop optimization at FIG. 2B can be provided to a CAD program for further modifications as described in process 200 of FIG. 2A. Thus, the result model from FIG. 2B can be provided as input for subsequent modification, and then provided for use in additive manufacturing. In some cases, the modified model generated through the loop optimization at FIG. 2B can be directly provided to an additive manufacturing tool for manufacturing a physical structure of the modeled object.

Figure 2C:
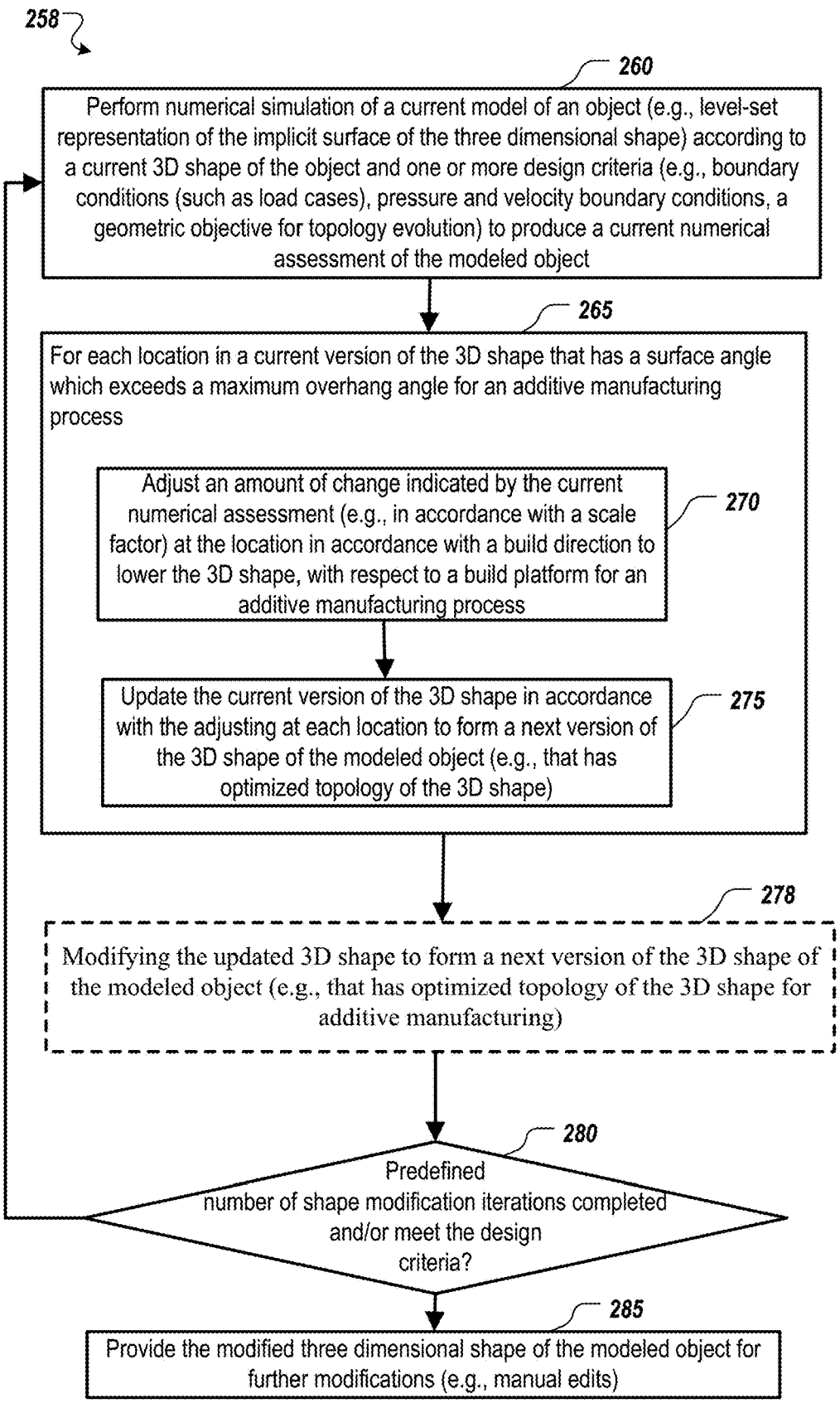
FIG. 2C shows an example of a process for generating a 3D shape of a modeled object by applying simulation results filtering (e.g., advection velocity filtering) to determine movement of the shape boundary of the object to adjust the evolution of the shape to improve its manufacturability.

FIG. 2C shows an example of a process 258 for generating a 3D shape of a modeled object by applying simulation results filtering (e.g., filtering of the advection velocity field generated by the optimizer from the output of the numerical simulation) to determine movement of the shape boundary of the object to adjust the evolution of the shape to improve its manufacturability. At 260, numerical simulation is performed for a current model of an object (e.g., level set representation of an implicit surface of a 3D shape) according to a current 3D shape of the object and one or more design criteria. The design criteria can include boundary conditions that can define in-use load cases or other requirements (e.g., pressure and velocity boundary conditions, a geometric objective for topology evolution), to produce a current numerical assessment of the modeled object. The numerical simulation 260 can be the same as, or substantially similar to, the described numerical simulation at 230 of FIG. 2B. The process 258 can be performed in the context of performing a loop optimization by varying a geometry of the 3D shape in a design space in accordance with the one or more design criteria. The varying of the geometry can include topology evolution of the 3D shape of the modeled object.

Based on the performed numerical simulation and produced current numerical assessment of the modeled object, the current 3D version (generatively designed) is updated at 265. The updating 265 is performed for each location in the current version of the 3D shape that has a surface angle which exceed a maximum overhang angle (as previously discussed) for performing additive manufacturing. The updating 265 of the geometry of the current 3D shape includes adjusting (at 270) an amount of change indicated by the current numerical assessment at the location in accordance with the build direction to lower the generatively designed 3D shape, with respect to a build platform for the additive manufacturing process, at the location. Further, the updating 265 includes updating (275) the current version of the 3D shape in accordance with the adjusting at each location. The updating of the current version as described at 275 can correspond to the performed transformation of the volume according to a velocity field that has been filtered, before application to the surface of the volume, so as to lower the shape, as described at 420 of FIG. 4 below.

The applied adjustment at each point on the surface of the shape adjust the evolution of the shape to make it more manufacturable and to encourage "low" designs which can still meet design criteria but require less support material during additive manufacturing because the geometry of the updated shape is generally closer to the build plate in the additive manufacturing machine.

After applying the simulation results filtering (e.g., advection velocity filtering) to update the version of the 3D shape, the updated 3D shape can be provided for further modification based on a geometry filter to form a next version of the generative design 3D shape. The further modifications at 278 can be optional modification, and they related to further improvement of the 3D shape to be prepared for an additive manufacturing process. The modifications at 278 can correspond to the modifications described for operation 240 of FIG. 2B.

After each iteration of modification is completed (an iteration of the processing going through the operations 260, 265, and optionally 278), at 280 it can be evaluated whether the 3D shape that is generatively designed meets the design criteria for defining the 3D shape (convergence) after a predetermined number of shape modification iterations has been completed. In other cases, the evaluation at 280 can correspond to the evaluation performed at 245 of FIG. 2B. If the predefined number is not reached and/or the current model has not converged to a stable solution meeting the design criteria, the method 258 can proceed with a subsequent iteration for performing the operations 260, 265, and optionally 278. Once the predefined number of iterations is completed and/or the 3D model has converged to a stable solution meeting the design criteria, then, at 285, the modified 3D shape of the modeled object is provided for further modification. In other cases, the modified 3D shape can be directly provided for use in manufacturing, e.g., additive manufacturing.

The updated 3D shape of the modeled object generated through the loop optimization based on simulation results filtering (e.g., advection velocity filtering) and optionally a geometry filter as described at FIG. 2B can be provided to a CAD program for further modifications as described in process 200 of FIG. 2A, or can be directly provided for use in an additive manufacturing process. Thus, the result model from FIG. 2C can be provided as input for subsequent modification, and then provided for use in additive manufacturing. Alternatively, the new 3D shape generated through the updating and modification operations defined at process 258 can be directly provided to an additive manufacturing tool for manufacturing a physical structure of the modeled object.

The support material is additional material that is not part of the object and is provided to support additive manufacturing of an object, for example, when produced in layers. A 3D shape that is generatively designed can be modified and/or adjusted as discussed above and in relation to FIGS. 1A, 1B, 2A, 2B, and 2C in a way that improves the shape for additive manufacturing by reducing the requirement for support material for the manufacturing.

For example, the amount of support material needed during additive manufacturing can be reduced by adjusting the positioning of the object with respect to the build plate, as shown at 138A of FIG. 1A. In this example beam 138A of FIG. 1A, the volume of support material that is required for manufacturing the beam is reduced. However, such reduction of the support material may impact the performance of the design and quality of the end-result of the physical part produced (e.g., depending on the reduction criteria). The 3D shape of the beam can be changed to lower the geometry in an optimized design. For example, such lowering can be performed as described in association with the simulation results filtering (e.g., advection velocity filtering) described in FIG. 2C. If the geometry is lowered in an optimized design closer to the build plate, the support material requirement may be reduced or in some cases removed.

As another example, the 3D shape of an object can be changed, as shown at the physical structure 138 of FIG. 1A, to minimize the size of the region which violates the overhang angle. Such a modification of the 3D shape to minimize the size of the region which violated the overhang angle can be performed based on geometry filtering applied on a 3D shape, for example, as described for process 200 of FIG. 2A. The physical structure 138 presents a modified beam shape that reduces both the contact area for the support structure 139, as well as its overall volume. The original beam's shape can be modified to form a teardrop-shaped of the physical structure 138 based on geometry filtering modification at FIG. 2A (operations 205, 210, and 215).

In some implementations, to perform geometry filtering to modify a 3D shape to minimize the regions of the object that require support material, initial input can be provided that includes a critical overhang angle (i.e., an angle below which the manufacturing process cannot reliably be performed to build the physical object), and the build direction (i.e., the orientation on the build plate in which the part will be manufactured). The critical overhang angle and the build direction can be dependent of the specific manufacturing process and manufacturing configurations.

FIG. 3 shows an example process 300 for modifying a 3D shape of a modeled object 310 in layers by offsetting profile representations in discrete layers of the three-dimensional shape that are defined along a direction associated with the manufacturing process to encourage production of a 3D model compatible with additive manufacturing processes. The example process 300 substantially corresponds to the process 200 of FIG. 2A. The example process 300 includes operations for modification of a generative design based on geometry filtering to produce a new 3D model of a part that reduces (or eliminates) the support structure needed to manufacture the physical structure of the designed part during an additive manufacturing process.

The 3D shape of the object 310 can be modified, by a CAD program, based on geometry filtering using profile offsetting. The 3D shape can be generatively designed 3D shape, and the geometry of the 3D shape can be iteratively varied in a design scape in accordance with design criteria, for example, as described in FIG. 2B when the geometry filtering is performed over the 3D shape to offset profiles by an amount associated with the manufacturing process. In some implementations, when the 3D shape is for use in additive manufacturing, the amount for the profile offsetting can be determined according to a maximum overhang angle for the additive manufacturing process.

In some implementations, performing geometry filtering on a 3D shape of a modeled object can minimize the area of a part that needs support materials or structures during additive manufacturing.

The 3D geometry of the 3D shape, can be sliced in parallel to the build plate 315. Multiple slice planes, such as slice plane 320 can be defined to form discrete layers of the 3D shape along a direction associated with the manufacturing process. A two dimensional profile representation of the 3D shape 310 in a given discrete layer can be extracted (e.g., as performed at operation 205 of FIG. 2A). Such profile representation based on the slice plane 320 is presented at 330.

For a profile within a current discrete layer to be manufacturable without (or with reduced requirements for) supports, the layer that is below that profile should provide some region (geometry) below at least some portions of the current discrete layer that support the profile not to have an overhang angle with respect the layer below that is greater than a critical value associated with the manufacturing. Different manufacturing processes and/or tools with particular techniques can be associated with different restriction requirements for an overhang angle that is allowable for the manufacturing to be performed.

In some implementations, some regions or locations within an object that is to be manufactured may be associated with different overhang angle and thus different offsetting of such regions may be relevant when evaluating a single profile representation.

A current 2D profile representation of the 3D shape in a current layer corresponding to the slice plane 320 is extracted and presented at 330. The 2D profile representation 330 is taken from a layer (corresponding to the slice plane 320) that is perpendicular to the direction associated with the manufacturing. In some instances, the direction of the manufacturing can be perpendicular to the build plate 315.

For the 2D profile representation 330, an offset curve 340 of the profile is defined. The offsetting curve 340 can be determined as described at operation 210 of FIG. 2A.

Distances between discrete layers defined for the 3D shape 310 can be evaluated. If the distance between the layer 320 of the 2D profile 330 and a below layer (not shown) is h, the offset curve 340 can be defined to offset the 2D profile 320 with an amount equal to a value determined according to formula (4) below:

$$\text{offset amount} = h \tan \alpha_0. \tag{4}$$

If the offset amount that is used to define the offset curve 340 is determined based on the distance between the layer that includes the 2D profile 330 and the layer below (i.e., equal to h), as well as the overhang angle of the manufacturing process, the layer below the 2D profile 330 that includes the offset curve 340 will support the current layer including the 2D profile 330 at most places.

In the example process 300, a geometry filter using profile offsetting can be implemented over the defined discrete layers of the 3D shape 310 by sweeping the layers from the top to the bottom of the volume along a negative build direction. For example, if an additive manufacturing process is about to be used for manufacturing an object based on a modified 3D shape based on a geometry filter as described in this example, the build direction is from the lowest layer to the highest layer. In this example, when the 3D shape's layers are processed, those layer would be processed in the reverse to the build direction, i.e., starting from the top layer and going through the below layers until the bottom layer is reached.

For each layer of voxels part of a slice plane (e.g., parallel to the build plate 315), a profile of the part is extracted (as shown at 330). The profile is offset inwards by an amount associated with the manufacturing process (e.g., as described in formula (4)), and a Boolean union of the offset profile with a 2D profile extracted from the layer below can be performed (at 330).

In some implementations, such geometry filtering using profile offsetting can be applied as part of an iterative loop optimization process for generatively designing a 3D shape in a design space that meet predefined design criteria. The incorporation of the geometry filtering as part of such process can be similar to the described process at FIGS. 2B and 2C.

The geometry filtering can be applied iteratively to each discrete layer of the 3D the shape based on a numerical assessment. By incorporating geometry filtering as part of an iteratively updating of a 3D shape to meet design criteria and to evolve the topology of the part, the final outcome of the modification can ensure that the outcome 3D shape (updated in accordance with simulation assessment and modified based on geometry filtering using profile offsetting) has minimal support required. Further, since the shape is generated based on simulation and optimization considerations, the iterative nature of the process of the modification of the shape can, for example, take advantage of incorporating additional material (as the shape is offset as described in process 300) to strengthen the part.

The generated modified 3D shape of the modeled object is not necessarily a completely self-supporting structure. In some cases, the offset curve may not support the layer above when a shock (or cusp) is encountered in the distance field. This can occur when there is an area of high curvature (as presented in FIG. 5), or when a set of faces collapse on each other (as presented in FIG. 6). In these cases, a small region of overhang violation is present, and support structures will be required. However, the regions that require support structure can be mainly lines and points instead of large areas, thus minimizing the amount of support material needed. Since the support material requirements can be minimized, those minimizations can be associated with lowering the costs of post-processing a manufactured part to remove the support material that is external.

Figure 4:
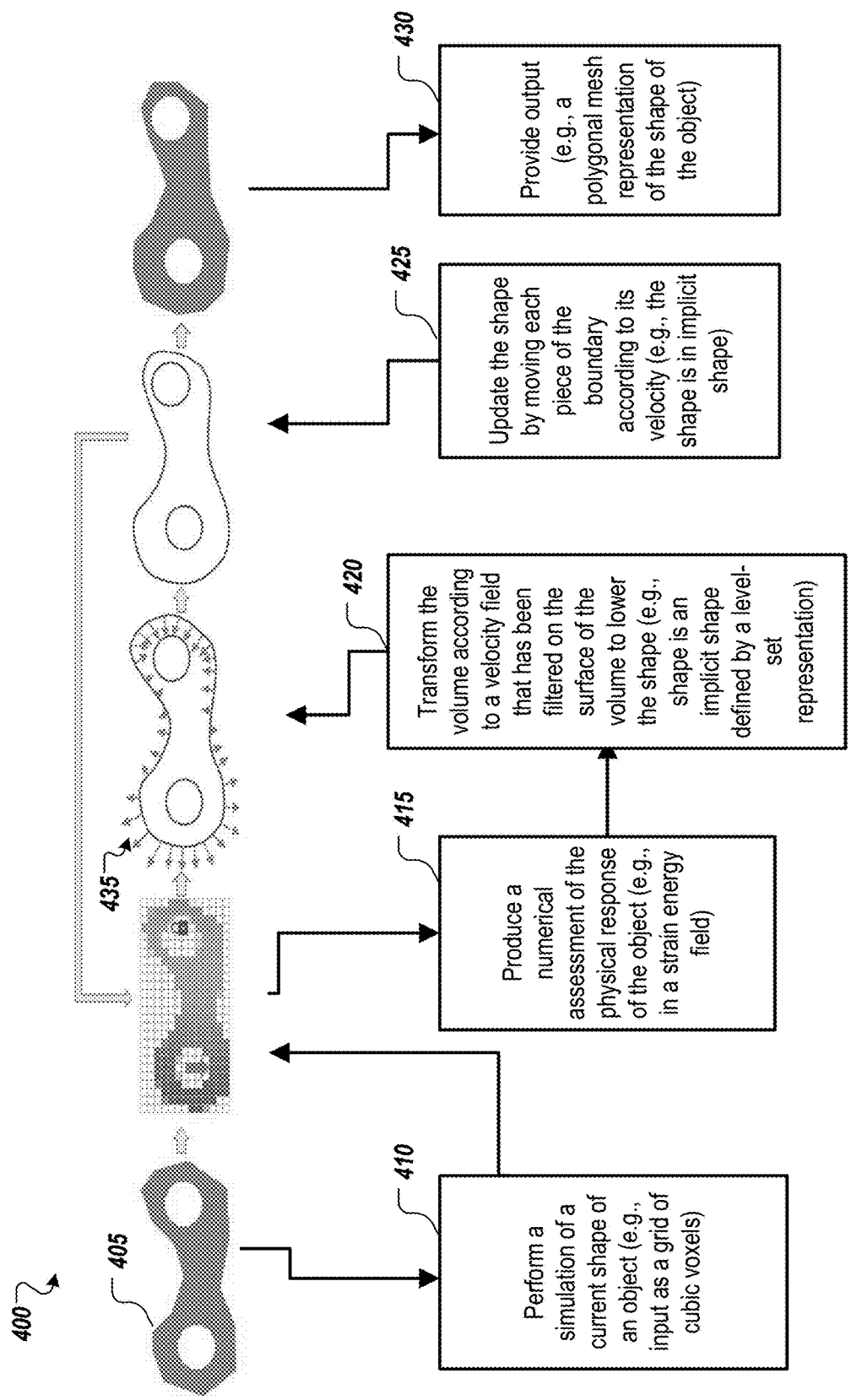
FIG. 4 shows an example of a process of iterative topology optimizations of an input polygonal mesh of an object based on simulation results filtering (e.g., advection velocity filtering) during generative design to generate an output polygonal mesh that can be used to improve manufacturability of the object.

FIG. 4 shows an example of a process 400 of iterative topology optimizations of an input polygonal mesh of an object based on simulation results filtering (e.g., advection velocity filtering) during generative design to generate an output polygonal mesh that can be used to improve manufacturability of the object. In some implementations, the simulation results filtering can be performed as described at operation 265 of FIG. 2C.

The example process 400 is for simulation filtering during generative design to encourage production of a 3D model compatible with manufacturing processes (e.g., subtractive manufacturing or additive manufacturing). The process 400 is specific level set topology optimization process that can be used to produce an "optimized" design or a "final outcome" which minimizes some quantity of interest (e.g., strain energy) subject to design constraints (e.g., mass, max stress, and manufacturability, among other examples).

The process 400 is an iterative process that includes performing (410) of a physical and/or physics simulation of a current 3D shape of an object to be manufactured. The simulation can be performed to compute strain energy inside the volume of the object. The simulation can be performed over an input shape 400 that can be provided as an input polygonal mesh. The simulation can produce a current numerical assessment 415 of a physical response of the object. In the example shown, the numerical assessment 415 of physical response is a strain energy field, but other types of physical assessments can also be used with the systems and techniques described herein. The physics simulator can produce fields of stress, strain energy, etc. everywhere inside the volume of the modeled part, and a shape optimizer can translate this to a velocity field. This transformation from simulation field to velocity can be as simple as a scaling and offset of the field to achieve the desired volume reduction. At 420, the strain energy field inside the modeled part is transformed into a velocity field on the surface of the volume in order to improve the shape. The transformation supports the evolution of the shape according to the velocity at each point by moving the geometry of the part towards a better optimized shape according to the simulation assessment.

At 425, the shape is updated by moving each piece of the boundary according to its velocity. When the shape is updated, the shape can be represented as an implicit shape (e.g., in a level-set representation). In some implementations, the operations of simulation, transformation and updating are performed iteratively until the 3D shape achieves a form that stays stable between subsequent iterations. In other instances, the operations are iterated until an exit condition is met. The exit condition can be predefined condition for the optimized result of the 3D model. During the optimization process (steps 410, 415, 420, and 425), the shapes that undergo modification are required to stay within a fixed design domain. The design domain may include user-specified regions such as "preserve bodies" that are required to remain filled with material throughout the optimization process.

When the shape is improved according to the velocity (at 420), the velocity field 435 is defined with respect to the surface of the shape. It is determined how the shape boundary should move at each point. The velocity field is defined as a scalar field and the velocity field is filtered to adjust the evolution of the shape to make it more manufacturable. The adjustment of the 3D shape to lower the position of the design according to the build direction can be performed as described at 270 of FIG. 2C. The use of velocity filtering as described in FIG. 2C encourages generation of "low" designs which meet design criteria (e.g., mechanical criteria) but require less support material during additive manufacturing. The shapes that are generated based on velocity filtering to modify the shape provide geometries that are closer to the build plate of the manufacturing tool. The modification of the velocity field includes subtracting a quantity that is dependent on the surface normal direction, the build direction, and the critical overhang angle. The modification can be applied to those faces of the shape that are exceeding the overhang angle. The intensity of the effect of the velocity filtering on the changes to the shape can be controlled by applying a scalar factor to monitor the evolution of the shape.

For example, the velocity field can be defined according to formula (5):

$$V_n = -\mu R(\nabla\phi \cdot d - \cos\alpha_0)(\nabla\phi \cdot d + \cos\alpha_0), \quad (5)$$

where Vn is the velocity field, and $\nabla\phi$ is the quantity dependent on the surface that is subtracted, d is the build direction, and the critical overhang angle is denoted with $\alpha_0$. R is a ramp function that ensures that the changes are applied only to regions that exceed the overhang angle. By applying a velocity field as defined in formula (5), a lower design that yet meets design criteria can be generated.

In another implementation, a simple constant downward velocity can also be used to filter the velocity field. Such simple velocity can be according to formula (6):

$$-(\nabla\phi \cdot d - \cos\alpha). \quad (6)$$

With the filtered physical assessment, the current version of the 3D shape is updated in accordance with computed shape change velocities for the implicit surface (e.g., in a level-set representation). The 3D shape can be modified using the velocity field of the current 3D shape of the modeled object.

The current 3D shape is updated 425 by moving the boundary of the 3D shape according to the computed shape change velocities, and the optimization loop repeats until a predefined number of iterations have been completed, convergence is achieved, or no significant changes to the shape have been made over a predetermined number of iterations. Once the optimization loop finished processing the shape, the output (e.g., a polygonal mesh representation of the shape of the object) is provided 430.

Figure 5:
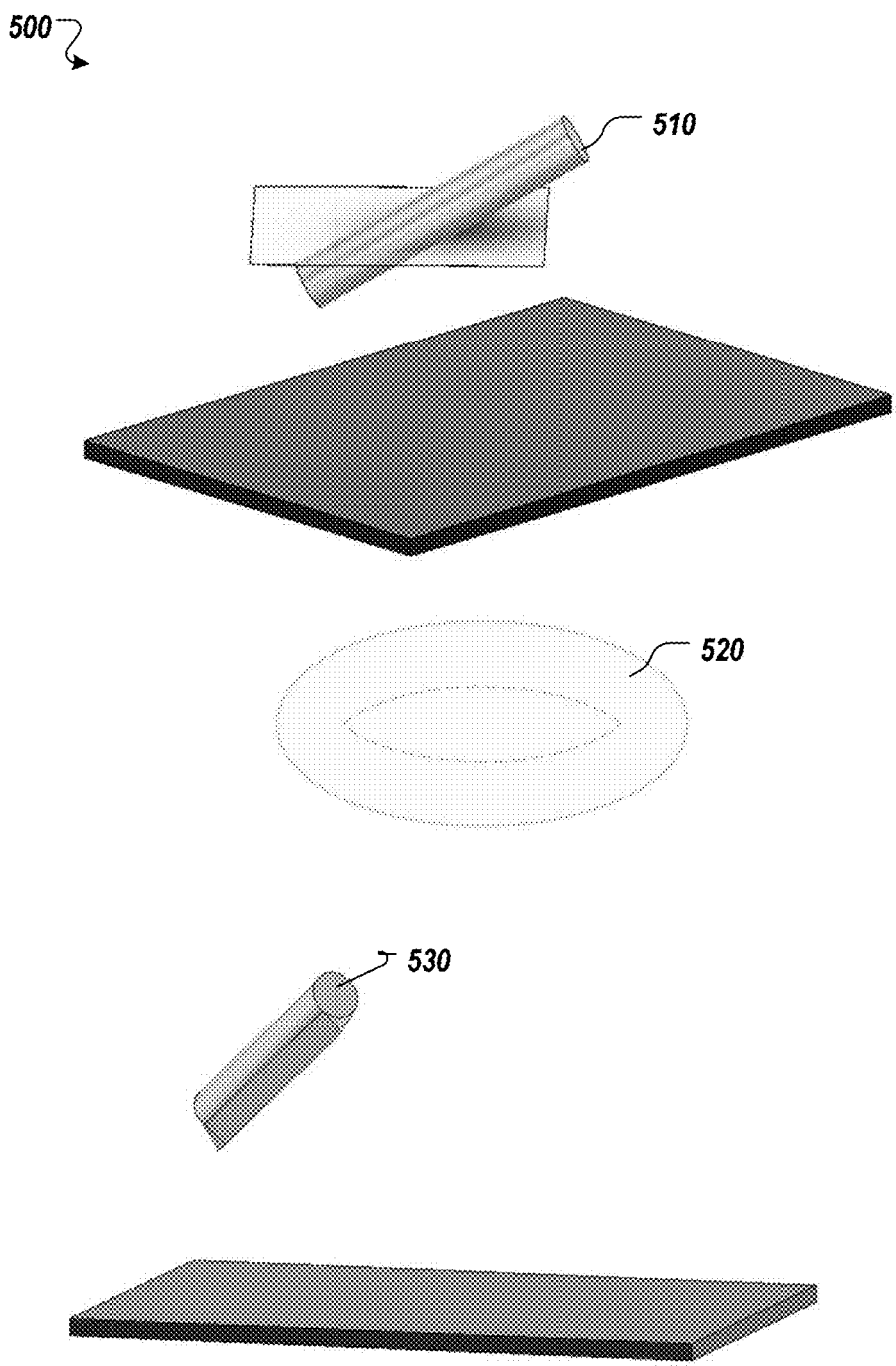
FIG. 5 is an example of a process of modifying a 3D shape of an object by applying geometry filtering to generate profiles in the case of high curvature and to provide a modified three-dimensional shape of the object for use in manufacturing.

FIG. 5 is an example process 500 of modifying a 3D shape of an object 510 by applying geometry filtering to generate profiles with high curvature and to provide a modified 3D shape of the object for use in manufacturing. The modification of the object 510 can be performed as described, for example, at FIG. 2A, 2B, 2C, and FIG. 3. The example process 500 applies geometry filtering using profile offsetting to create a teardrop shape as previously discussed. In some implementations, the generation of such teardrop shape can be performed by offsetting profiles with an amount corresponding to the maximum overhang angle associated with the additive manufacturing process. The 3D shape of the object 510 is associated with areas of high curvature. The beam can be processed layer by layer based on slicing the 3D shape (and defining discrete layers of the 3D shapes along a direction of the manufacturing) to offset two dimensional profile representations of the 3D shape at each of the discrete layers corresponding to the slices. The produced profiles are with high curvature. For example, 520 presents an example extracted 2D profile and its offset. The offset can be defined as described at FIG. 3. At 530, a modified 3D shape generated based on geometry filtering is provided.

Figure 6:
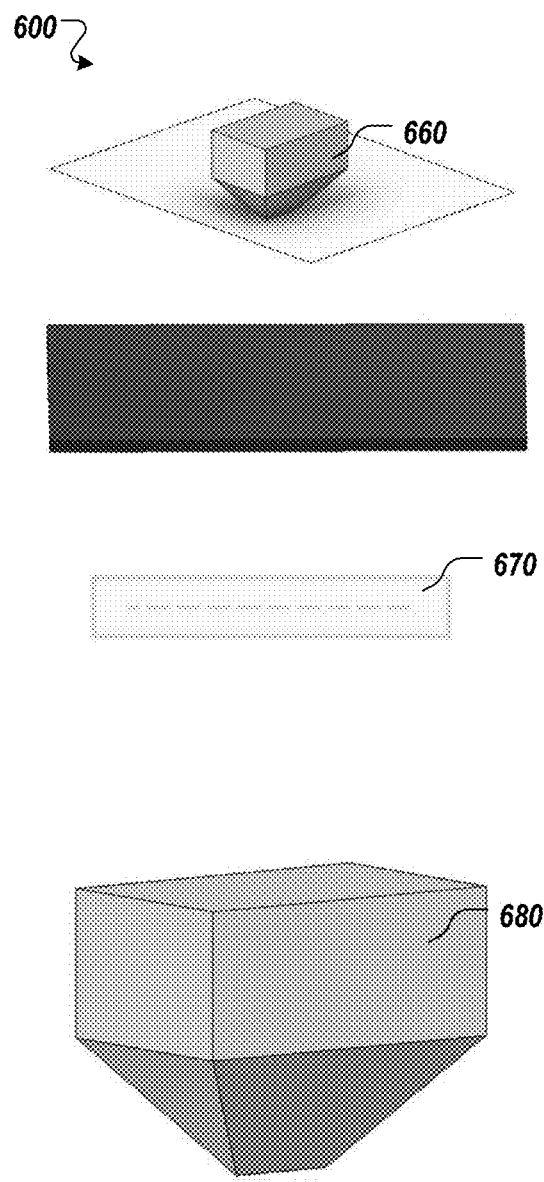
FIG. 6 is an example of a process of modifying a three-dimensional shape of a box by applying geometry filtering to provide a modified three-dimensional shape of the object for use in manufacturing.

FIG. 6 is an example process 600 of modifying a three-dimensional shape of a box 660 by applying geometry filtering to provide a modified three-dimensional shape of the object for use in manufacturing. The 3D shape of the box 660 has faces that collapse on each other. The 3D shape 660 can be processed as described above for example, at FIGS. 2A, 2B, 2C, and 3. The 3D shape 660 can be modified by performing offsetting by an amount associated with the manufacturing as discussed at FIG. 3 to each of the determined discrete layers of the 3D shape along the direction of the manufacturing process. Profile 670 corresponds to an example 2D profile sliced from the 3D shape 660. In some cases, a profile, such as the profile 670 can be offset to a straight line based on the offsetting amount.

Based on the geometry filtering using profile offsetting, the 3D shape 660 can be modified to provide the new 3D shape 680.

Both shapes 530 and 680 that are output from a geometry filtering using profile offset does not provide self-supporting structure, but reduces the need for support structure to be used during manufacturing, such as additive manufacturing.

Table 1 below includes pseudocode for geometry filtering using profile offset as described throughout this document and for example at FIGS. 2A, 2B, 2C, 3, 5, and 6.

TABLE 1

| |
| --- |
| Given: Build direction bdir, 3D levelset geom, critical overhang angle alpha |
| Objective: Filter the geometry to remove most overhangs |
| 01    layersIn = SliceVolumeTopToBottom(geom, bdir) |
| 02    supportForLayerAbove = MakeEmptyLayer( ) |
| 03    layersOut = empty list |
| 04    for each layer in layersIn do |
| 05        layer = Renormalize(layer) |
| 06        layerPlusSupport = BooleanUnion(layer, supportForLayerAbove) |
| 07        layerPlusSupport = Renormalize(layerPlusSupport) |
| 08        supportForLayerAbove = Offset(layerPlusSupport, -tan(alpha) * voxelHeight) |
| 09        layersOut.Append(layerPlusSupport) |
| 10    next layer |
| 11    geom = AssembleVolumeFromSlices(geom, layersIn, layersOut) |
| 12    geom = Renormalize(geom) |

The utility function SliceVolumeTopToBottom (at line 1 of Table 1) splits the 3D voxel volume into one-voxel-thick layers (or slices), where each entry in the layers list is a 2D array of voxels including the same value as the corresponding slice of the 3D volume. The slices can be taken perpendicular (or substantially perpendicular) to the build direction.

Defining the slices as perpendicular can be required to provide them to be axis-aligned, and ordered from top to bottom (i.e., along the negative build direction).

The volume of a 3D shape of an object can be sliced into one-voxel-trick layers, maintaining a one-to-one correspondence between the pixels in each layer (in the 2D domain) and voxels in the 3D domain.

The MakeEmptyLayer function can be invoked to produce a 2D layer of the same size and shape as the layers extracted from the volume but having no geometry. In some implementations, the 2D profile representations are 2D level sets. BooleanUnion is a routine (or procedure) that can combine two 2D profile representations (e.g., as level sets) by taking the pixel-wise minimum value.

A renormalization can be applied to the combined 2D profile representation. For example, a level set renormalization routine can turn the 2D level set output from BooleanUnion into a signed distance field, keeping a zero-contour location fixed and updating values at the level set values so that the gradient has unit magnitude everywhere. The Offset function is used to perform an offset on a signed distance field by subtracting the specified constant to the value of every voxel to shift the location of the zero-contour outward for a positive offset value and inward for a negative value.

The AssembleVolumeFromSlices procedure reconstructs the 3D shape from the slice data. Table 2 below includes pseudocode for the AssembleVolumeFromSlices procedure.

space defined by the plane normal to the build direction at the bottom depth (this is implemented with the max function in line 9).

A threshold value (at line 7) restricts the update of the geometry so that the update can only occur in regions where the output layer differs significantly from the input layer. The threshold could be zero or some small value. In some case, the threshold value can be defined to the narrowest bandwidth. Alternately, the pixel-wise difference between the input layer and the output layer can be evaluated and compared to the threshold.

The GetBottomDepth( ) function finds the minimum over the points on the surface of the point coordinate dot product the bdir vector. Similarly, the plane's depth is the dot product between a point on the plane and the bdir vector. The VoxelFromPixel function inverts the mapping used in SliceVolumeTopToBottom function to recover the source voxel used originally to populate a layer's pixel. In some implementations, such data can be stored as a lookup table when the original slicing is performed and used later on at runtime.

Figure 7A:
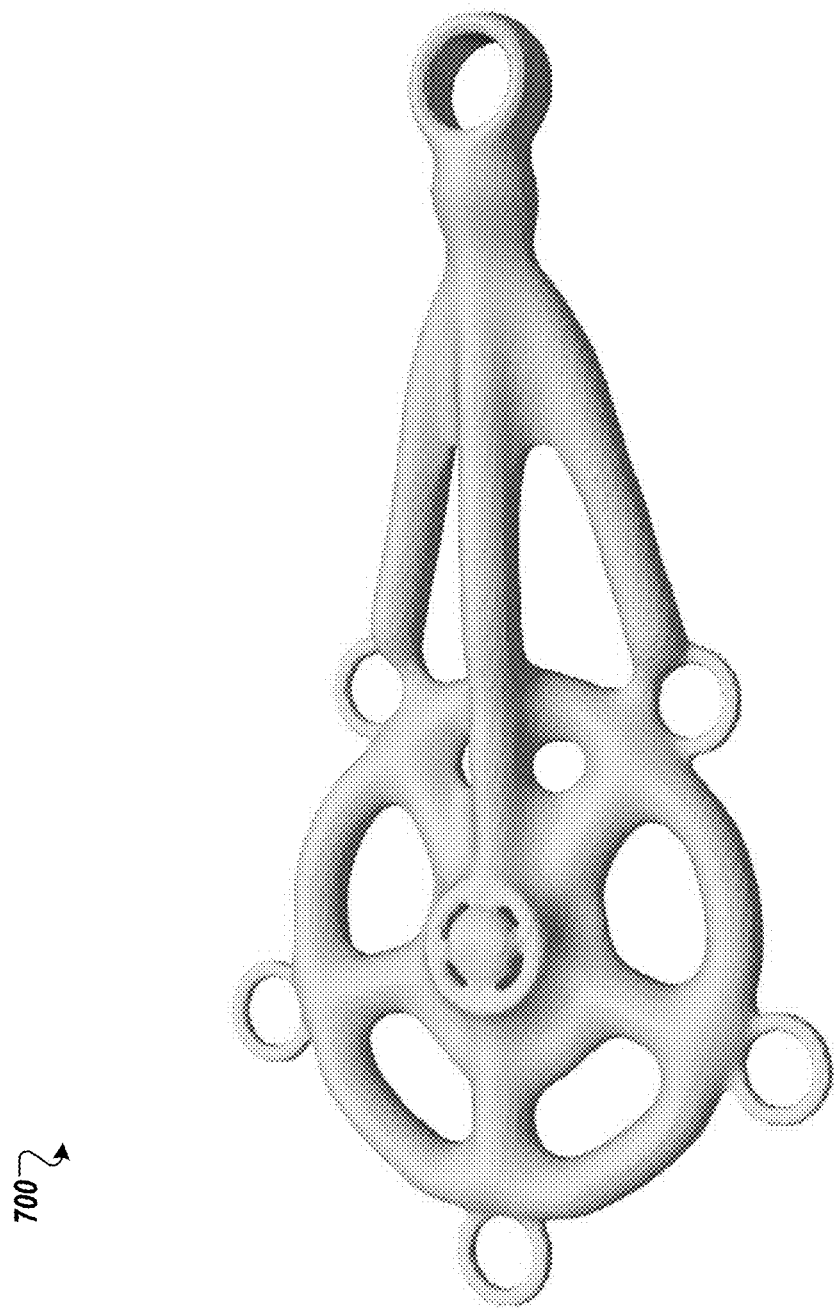
FIGS. 7A and 7B show examples of 3D shapes before and after applying a geometry filter to generate a modified 3D shape with minimized support material required to be used when manufacturing with an additive manufacturing process.
Figure 7B:
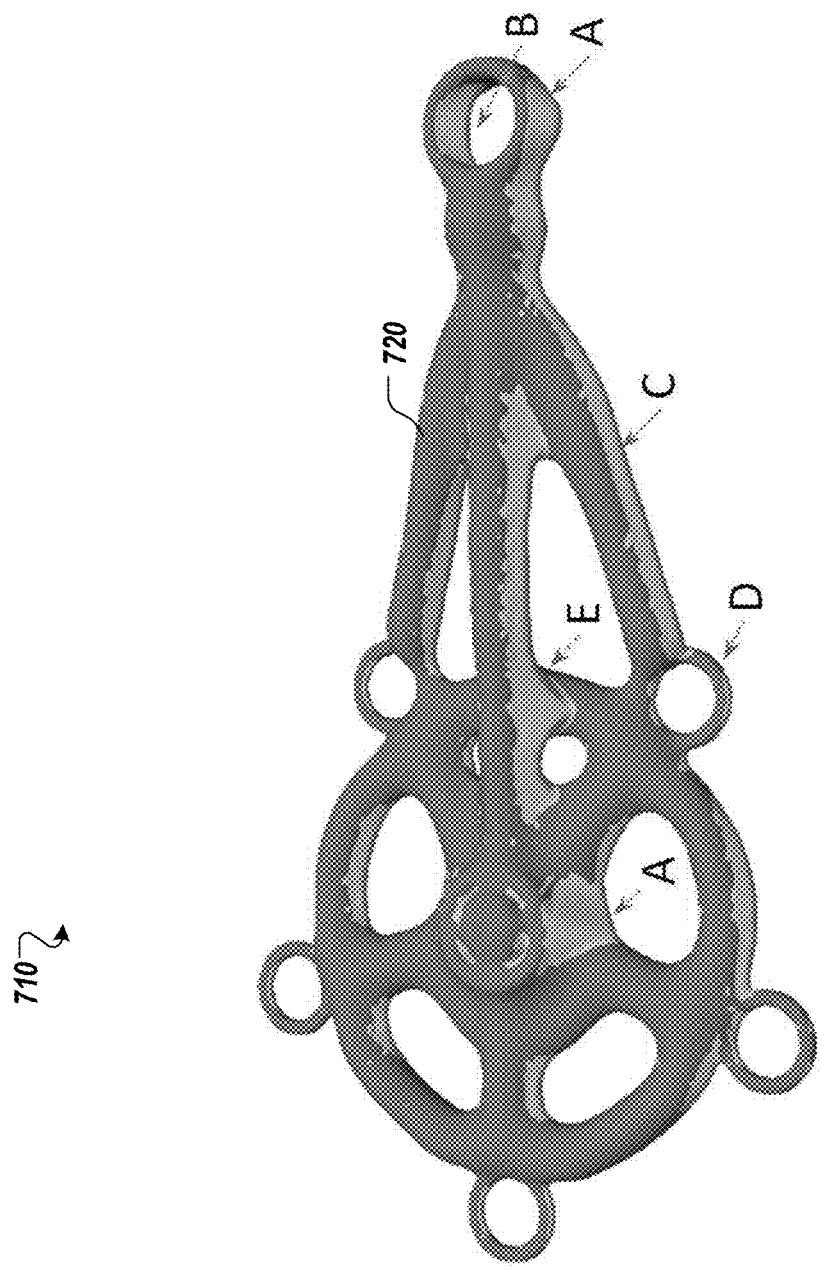

FIGS. 7A and 7B shows examples 3D shapes before and after applying a geometry filter to generate a modified 3D shape is with minimized support material required to be used when manufacturing with an additive manufacturing process. FIGS. 7A and 7B include a 3D shape 700 before applying a geometry filter and a 3D shape 710 that is provided after applying a geometry filter. The applied geometry filter can use profile offsetting as discussed throughout this document and for example at FIGS. 2A, 2B, 2C, 5, 6A, and 6B. The 3D shape 710 is provided after applying modifications to each discrete layer of the 3D shape 700, which are defined along a direction associated with the manufacturing process. The 3D shape 710 is a shape that is

TABLE 2

Given: Build direction bdir, 3D levelset geom, extracted layer slices layersIn, supported layer slices layersOut
Objective: Update geomto incorporate geometry from the layersOutwhen it differs from layersIn
```
01      bottomDepth = geom.GetBottomDepth(bdir)
02      for each layerIn, layerOut in layersIn, LayersOut:
03   03      layerChange = BooleanDifference(layerOut, layerIn)
04   04      layerChange = Renormalize(layerChange)
05        distFromBottom = (layerIn.depth − bottomDepth) / geom.VoxelSize
06        for each pixel in layerIn:
07          if layerChange[pixel] < threshold:
08            voxelId = VoxelFromPixel(layerIn, pixel)
09            geom[voxelId] = max(−distFromBottom, min(layerOut[pixel],
                 geom[voxelId]))
10          end if
11        next pixel
12      next layer
```

The algorithm implemented at the AssembleVolumeFromSlices procedure can add additional geometry to an input in the form of an input geometry voxel-for-pixel based on the values from the layersOut list (based on the min( ) function invocation at line 9). An explicit "build plate" operation is executed such that the support geometry does not continue all the way to the bottom of the volume if such geometry would extend past the natural bottom of the part. To provide that, a bottom coordinate of the part as viewed from the build direction can be computed with GetBottomDepth. Then, for each layer, the distance from the bottom of the part is computed (based on distFromBottom variable) and the computed distance can be used to execute a Boolean Intersect on the supported shape with the halfgenerated and shows the effect of the geometry filter using profile offsetting with an amount (e.g., based on the overhang angle) on a design.

FIG. 7B shows the same design as the one associated with FIG. 7A, but the generated shape is provided after applying the geometry filter where the differences 720 with the original design are highlighted in a lighter shade. The geometry filter, when applied on the original design of FIG. 7A, generates cusp features at the modified shape 710 that are located below cylindrical regions corresponding to the original design to allow the shape to be supported by a small column of support structure rather than a larger area support needed on the unmodified geometry (see label A in FIG. 7B).

A similar result of applying the offsetting on the 3D shape 700 can be acknowledges around the concave region B of

710 that is modified with a tapered geometry that ends in a line needing support instead of a bulkier area support.

Label C refers to a beam, which has the desired tapered or teardrop-shaped profile.

Figure 7C:
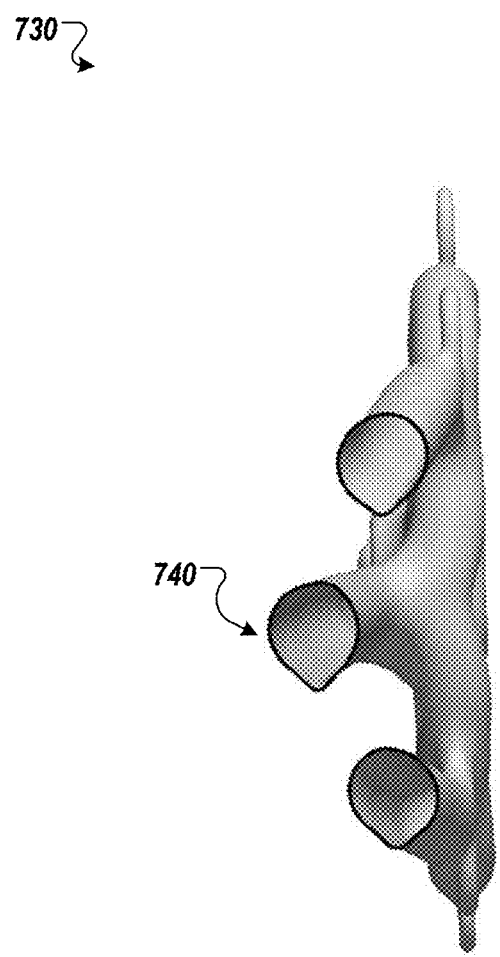
FIG. 7C shows an example of a 3D shape, presented in a sliced view, which is generated after applying a geometry filter to generate a modified 3D shape with minimized support material required to be used when manufacturing with an additive manufacturing process.

FIG. 7C shows an example 3D shape, presented in a sliced view, which is generated after applying a geometry filter to generate a modified 3D shape is with minimized support material required to be used when for manufacturing using with an additive manufacturing process.

FIG. 7C shows a cross-section view 730 of the 3D shape 710. The cross-section view 730 shows the tear-drop-shaped profile modification (e.g., tea-drop-shaped profile 740) related to the modifications performed at the 3D shape 710 based on the geometry filtering using profile offsetting.

Label E of the 3D shape 710 of FIG. 7B indicates a region where the original design had an overhanging region that could be completely corrected. The portion of the modified 3D shape 710 that in in the region E is an area that is generated by the geometry filter and is supported by the existing geometry of the modified 3D shape 710.

In some implementations, the implementation of a geometry filter with profile offsetting can require one-to-one correspondence between the pixels in each layer and the voxels in the 3D volume. To be able to provide such correspondence, some constraints can be implemented for the build direction, which can be along one of the principal directions (X, Y, Z). In some cases, trilinear interpolation can be used to construct the layers from the input volume to constrain the build direction while maintaining the required one-to-one correspondence. In such case, the layers can form a voxel volume rotated with respect to the input voxel volume. When reassembling the volume from the layers, a build direction-aligned volume can be constructed based on data from the layersOutdata, and then trilinear interpolation can be applied to determine the new value corresponding to each pixel in the original volume geometry.

In some implementations, the filtering based on the overhang angle can be applied on every iteration of the optimization during the generative design processes. Such filtering can include velocity filtering (e.g., as described at FIG. 2C), geometry filtering (as described in FIGS. 2A, 2B, 2C, 5, 6A, and 6B), or both. In some other implementations, filtering can be implemented to be enforced only after a set of iterations (or a portion of the shape) had been performed and a portion of the shape has been through some optimization (e.g., based on simulation assessment). In such implementations, the filtering can be ramped-up at a certain stage of an optimization process and be enforced to the end of the process.

For the implementations where the velocity filter is incorporated into an optimization process of a 3D shape, the value of $\mu$ can be slowly increased from 0 to its target value, which will slowly increase the degree to which the velocity filter affects the shape evolution.

For the implementations where the geometry filter is incorporated into an optimization process of a 3D shape, the filtering can be enforced by starting modifications that are associated with a very high overhang angle (close to 90 degrees, which corresponds to "all overhangs are allowed"), and then slowly reducing the overhang angle used to offset the profiles until the used overhang angle reaches a target value. Alternately, instead of directly applying the results of the geometry filter to the input volume, the geometry filtering can be implemented by offsetting with an amount that is blended with a scalar blend factor such that the result of the offsetting is the sum of times the input (unprocessed) signed distance field plus $(1-\beta)$ times the output (processed) signed distance field. In some implementations, based on the blending, a current version of the 3D shape can be produced by mixing a next version of the 3D shape from a prior iteration with an updated version of the 3D shape from the prior iteration. The amount of the next version that can be used in the mixing can increase relatively to an amount of the updated version in each of multiple subsequent iterations from a multi-iteration process.

In some implementations, the process of mixing can be performed until none of the updated version and all of the next versions are used as the current version of the 3D shape in a next iteration of varying (or modifying). The determination of whether to proceed blending until reaching such criteria can be reduced, for example, to a certain percentage of blending that can be considered as a threshold blending, and when reached, the blending can be finalized.

The introduction and enforcement of the filtering during the generative design process can be performed either linearly or nonlinearly. In some instances where a geometry filter with solid blending is applied, the ramping up of the geometry filter can be performed as a sub-linear ramp, since some of the material added with the filtering in a previous iteration is still present, and thus creating a compounding effect.

In some implementations, additive manufacturing allows "bridging" that allows a small region of overhanging geometry to be present when connecting two self-supporting beams of a face. The geometry filtering presented at FIGS. 7B and 7C does not account for such "bridging" effect. In some implementations, geometry filtering that accommodates bridging can be provided.

Figure 8:
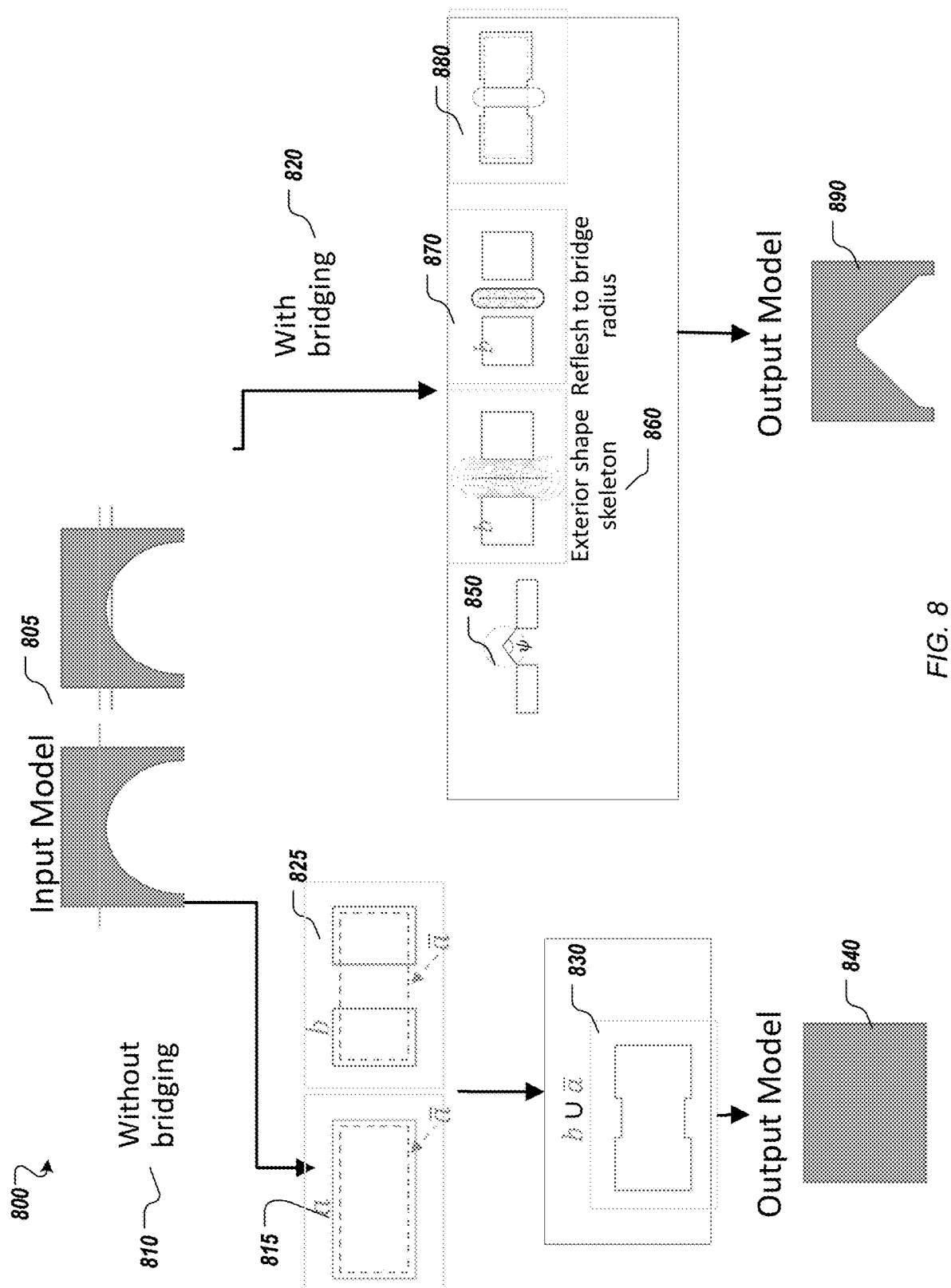
FIG. 8 shows an example of a process of generating output 3D shapes tailored for manufacturing physical structures by using geometry filtering with and without accounting for a bridging effect in a region of overhanging geometry.

FIG. 8 shows an example process 800 of generating output 3D shapes tailored for manufacturing physical structures by using geometry filtering with and without accounting for a bridging effect in a region of overhanging geometry. The example process 800 modifies a generatively designed 3D shape of a part that is generated as described at process 200 of FIG. 2A, process 228 of FIG. 2B, process 258 of FIG. 2C, and throughout this document, where the generation of the output model either allows enforcing a "bridging" effect and allowing overhanging geometry to be present when connecting self-supporting regions or faces (as presented on the right hand side at 820) or not allowing (on the left hand side at 810).

The example process 800 involves computing an exterior shape skeleton of each 2D layer during processing of a 3D shape of a modeled object and identifying regions where the skeleton meaningfully intersects the offset of the layer above. In these cases, a small tool geometry can be constructed by refleshing the skeleton and subtracting the small tool geometry from the geometry needed to support the layer above.

An input model 805 is received. The input model 805 is an arch, and at 815 the arch is presented from a birds-eye view, and it can be assumed that the shape extends far beneath the upper layer with the build direction coming out of the page. In some implementations, such geometry can be slightly modified to reduce the area of the overhang in the center of the arch and provide it in a shape that is easier to manufacture.

In some implementations, to generate a 3D model that can be used for manufacturing the arch, the 3D model can be implemented as described herein and following an implementation applying filtering, such as geometry filter using profile offsetting. Such modification of the 3D model can be performed without considering the "bridging" effect.

At 810, if geometry filtering is used to modify the input model 805 to generate an output modified 3D shape, the 3D shape can be sliced (as previously discussed) as shown at 815. An offset can be determined to obtain a geometry needed to be supported, i.e., a, by a layer below the current layer (a) 815.

A next (subsequently identified layer that is along the direction of the build) layer below the current layer 815 can have a 2D profile slice b (profile b 825), and the union of b with a can set the output contents of layer b, profile 830. Based on such geometry filtering, an output model 840 can be generated. The geometry filter applied to the input model 805, when not applying bridging considerations, fills in the entire interior of the arch, leaving a solid block.

In some implementations, bridging considerations may be taken into account when implementing filtering. For example, whether or not to implement bridging can be a configuration parameter for the generative design process. The configuration parameter can be either set by a user or can be provided from another system or application.

At 820, bridging considerations are taken into account when modifying the input model 805. To implement bridging, instead of directly computing the union b∪ā(830), the exterior skeleton of shape b can be computed. The exterior skeleton can be defined as the centers of a set of circles which are entirely outside of b and touch the surface of be in at least two places. The exterior skeleton can be filtered so that the angle between the vectors to the two contact points (ψ 850) is greater than a predefined degree (e.g., 110 degrees).

The skeleton is shown at 860. The skeleton can be "refleshed" by inflating a ball around each skeletal point, with the ball diameter set by the maximum bridging distance. The maximum bridging distance can be a value that is fixed or can be process dependent (e.g., dependent on the specific additive manufacturing process used for manufacturing a part based on the output model). This "refleshed" exterior skeleton 870 can be subtracted from the shape needed to support the layer above, giving a new shape of layer b 870 and the final part shape at a subsequent profile (layer) below profile b shown at 880. An output model 890 can be generated based on implementing geometry filtering with "bridging" considerations.

Figure 9:
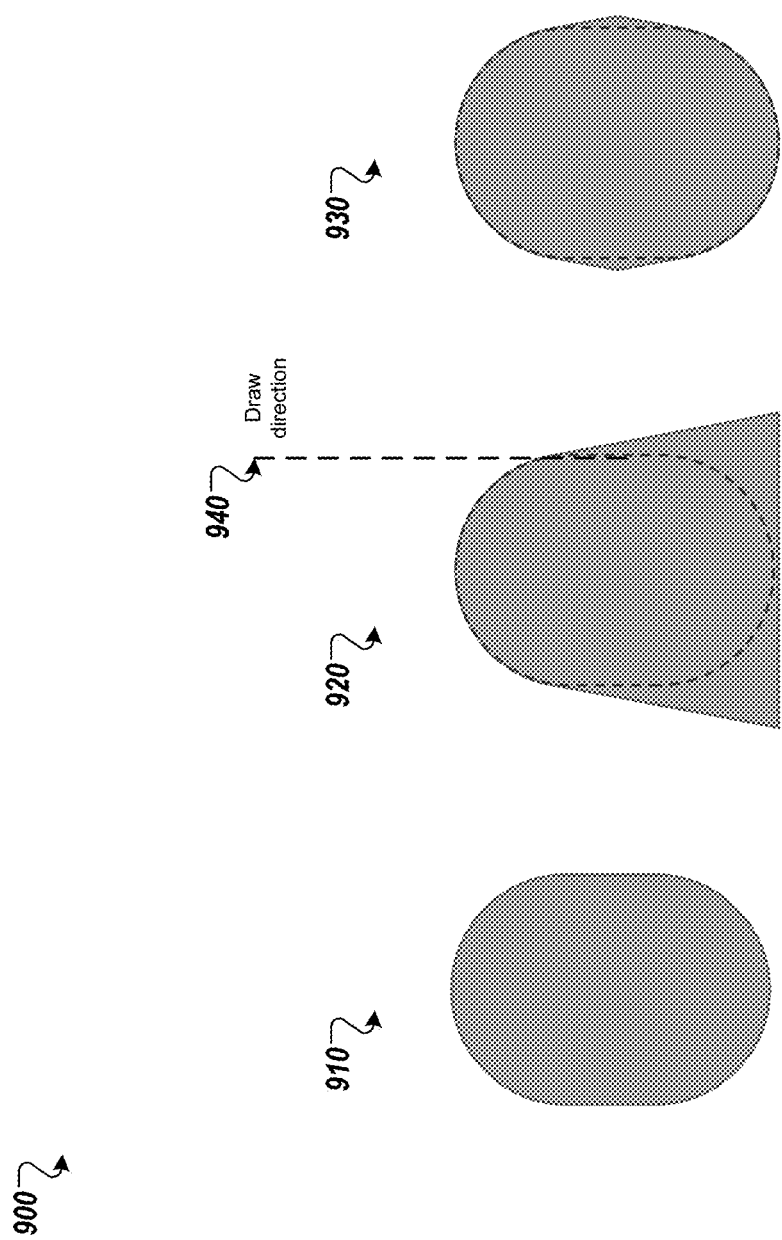
FIG. 9 shows an example of a casting process that includes offsetting a two dimensional profile representation outward by an amount, which is determined in accordance with a minimum draft angle for the casting process.

FIG. 9 shows an example casting process 900 that includes offsetting a two dimensional profile representation outward by an amount, which is determined in accordance with a minimum draft angle for the casting process. In some implementations, a generated 3D shape based on modification according to the filtering described throughout this disclosure, can be provided for use in manufacturing processes other than additive manufacturing. Such processes can include a casting or a molding process. The direction that can be used for defining the discrete layers sliced from the original shape can be a draw direction 940 of either the casting or the molding processes. To implement filtering that produces 3D shapes that are tailored to casting or molding processes, the offsetting that is done as part of the filtering can be offsetting outwards by an amount that is determined in accordance with a minimum draft angle for the casting or molding processes.

The filtering described in the present disclosure can be adjusted to a different configuration to produce one- or multiple-draw direction castable parts. Such different configuration can be implemented by adjusting the implementation of the geometry filtering, as shown in Table 1. The change in the implementation can be based on switching the sign of the offset operation in Line 8 to create an outward taper with a draft angle α (such as a minimum draft angle) as the shape is processed along a direction, which becomes the negative draw direction of the casting or molding processes.

An original shape 910 can be used as an input for a modification based on implementing a geometry filter using profile offsetting to the profile representations at each discrete layer of the original shape 910 by the amount determined in accordance with the minimum draft angle. At 920, a 3D modified shape optimized for single-sided molding or casting process defined by performing the geometry filtering as described above.

A two-sided molding process can be approximated by performing the geometry filtering twice, once for each draw direction, and taking a Boolean intersection of the results as shown at 930. A multi-part molding process can also be approximated by performing substantially similar modifications to determine a result output model for manufacturing.

In some implementations, the offsetting values can vary across different layers by configuring the overhang angle (alpha at Table 1) be dependent on the identification of the layer (e.g., a function of the layer's ID).

In some instances, the offsetting amount can vary within a single layer. This can be done, for example, if it is not desirable to add geometry to make preserve bodies conform to a particular draft angle. For example, such considerations or constraints to the changes made can be based on user input and/or user predefined requirements for casting constraints. In that example, one offset value can be associated with the design space away from the preserve bodies and a second (different) offset value can be used near the preserve bodies. In some cases, the second offset value can be relatively smaller so that it can be associated with smaller corrections of the shape near the preserve bodies. In some instances, a transitional region (or zone) can be maintained between the two offset values to keep the overall "offset" field continuous. In some other instances, the use of different offset values within a single layer can be in response to evaluations related to the geometry in the layer itself. In some implementations, offsetting can be implemented as a 2D spatially-varying offsetting. In that case, the offset function as presented in Table 1, can be reformulated. The offset function can be defined to accept a (potentially) spatially-varying 2D "offset field" that includes the amount by which to offset the 2D profile at each point in the slice. Then, for example, instead of applying the offset as a simple subtraction of the constant alpha, the value can be subtracted pixel-by-pixel in the corresponding location in the offset field. In some cases, the implementation can use the "offset field" as a kind of velocity field, perform a normal extension to ensure that the velocity field is uniform along the normal direction of the profile (e.g., standard practice in level set topology optimization), and then use advection to perform the actual offsetting (e.g., with advection time fixed at 1.0).

In some implementations, the manufacturing process is a two- or more-sided molding process where a first draw direction of the multiple draw directions corresponds to the multiple sides. The input 3D shape can be modified, as described in process 200 of FIG. 2A, by implementing a filter using profile offsetting to generate a first modified 3D shape. Further modification can be implemented based on the first modified 3D shape. The modifications can be performed for each of two or more discrete layers of the 3D shape along a second draw direction of the two or more draw directions. The modifications include producing a second modified 3D shape by extracting a second two dimensional profile representation of the 3D shape in a second current discrete layer. The second two dimensional profile representation lies in a plane that is perpendicular to the second draw direction. The modifications further include offsetting the second two dimensional profile representation outward by the amount to form a second offset two dimensional profile representation of the second current discrete layer. Then, a second next discrete layer is changed using the second offset two dimensional profile representation of the second current discrete layer. Based on producing a second modified 3D shape, that second modified 3D shape is used for a Boolean intersection with the first modified 3D shape to produce an output 3D shape of the modeled object.

Figure 10A:
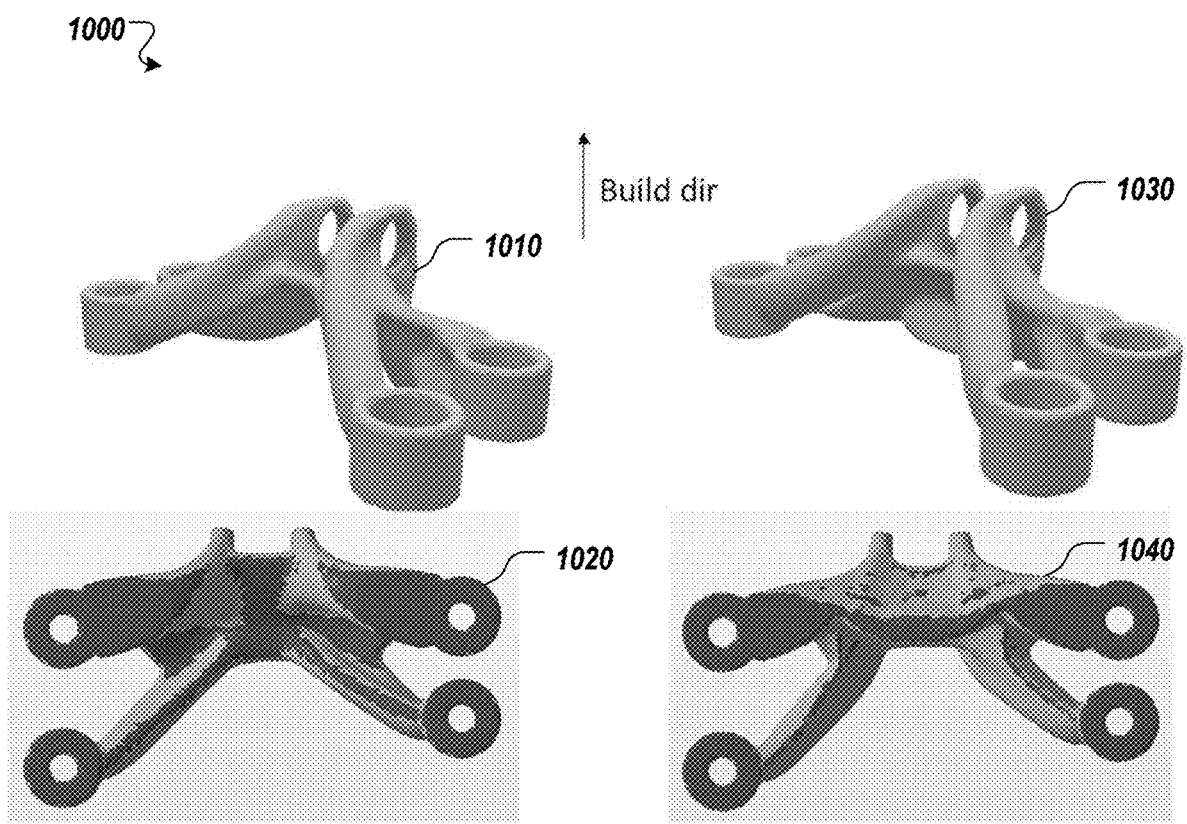
FIG. 10A shows comparative results of 3D shapes of a GE bracket object generated by either applying or not applying additive overhang constraints when applying geometry and velocity filtering to prepare designs for additive manufacturing.

FIG. 10A shows comparative results of 3D shapes of a GE bracket object generated by either applying or not applying additive overhang constraints when applying geometry and velocity filtering to prepare designs for additive manufacturing. In some implementations, when filtering is performed to modify a 3D shape of an object that is for use in manufacturing a physical structure using an additive manufacturing tool, additive overhang constraints can be considered. The additive overhang constraints can be used when performing the filtering to restrict some of the modifications done on the shape at the offsetting iterations. If additive overhang constraints are used for generating a modified 3D shape, for example, as described in processes 200 of FIG. 2A, 228 of FIG. 2B, or 258 of FIG. 2C, then overhanging cavities in a center of a volume can be removed (and filled for example, with a thin sheet of material), instead of keeping them as cavities.

The GE Bracket problem 1000 shown on FIG. 10A, is used as an example for implementing filtering without restrictions considering additive overhang constraints, such as at 1010 and 1020, or with additive constraints, as shown at 1030 and 1040. Parts 1010 and 1030 show a front view of the part without or with additive constraints restrictions. Parts 1020 and 1040 present a bottom view of the part without or with overhang constraints. At parts 1030 and 1040, the overhang constraints are defined for overhangs over a particular input critical overhang angle.

The shape of the part as shown on FIG. 10A is generated based on filtering, including geometry, velocity, or both, to modify the shape to make the part easier to manufacture. The geometry filter and velocity filter can work together to bring some regions of the design down, closer to the build plate, and ensure a uniform, manufacturable draft on the shape upward to support defined criteria (e.g., manufacturing constraints such as additive constraints).

At 1020 and 1040, the darker highlighted regions are regions with overhang over 55 degrees. By using geometry and velocity filtering with additive constraints, the areas violating the overhang (as shown in darker shade at 1040) are fewer compared to the areas violating the overhang (as shown in darker shade at 1020).

Figure 10B:
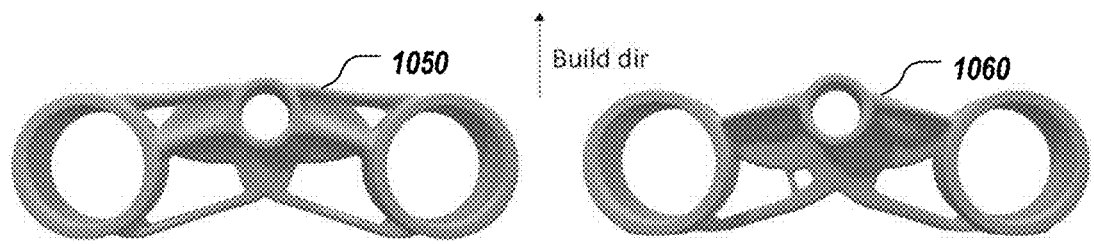
FIG. 10B shows comparative results of 3D shapes of a triple clamp object by either applying or not applying additive overhang constraints when applying geometry and velocity filtering to prepare designs for additive manufacturing.

FIG. 10B shows comparative results of 3D shapes of a triple clamp object by either applying (1060) or not applying (1050) additive overhang constraints when applying geometry and velocity filtering to prepare designs for additive manufacturing.

When geometry and velocity filtering is applied to providing a modified 3D shape of the triple clamp as shown at FIG. 10B, the geometry filter and velocity filter work together to bring the geometry down, towards the build plate and to remove bars which would require additional supports. Instead, larger supportable faces are provided. In this case, there are still regions which require support in the middle of the domain, but the teardrop shape of the bottom of the beams ensures the required support can be minimal.

Figure 11:
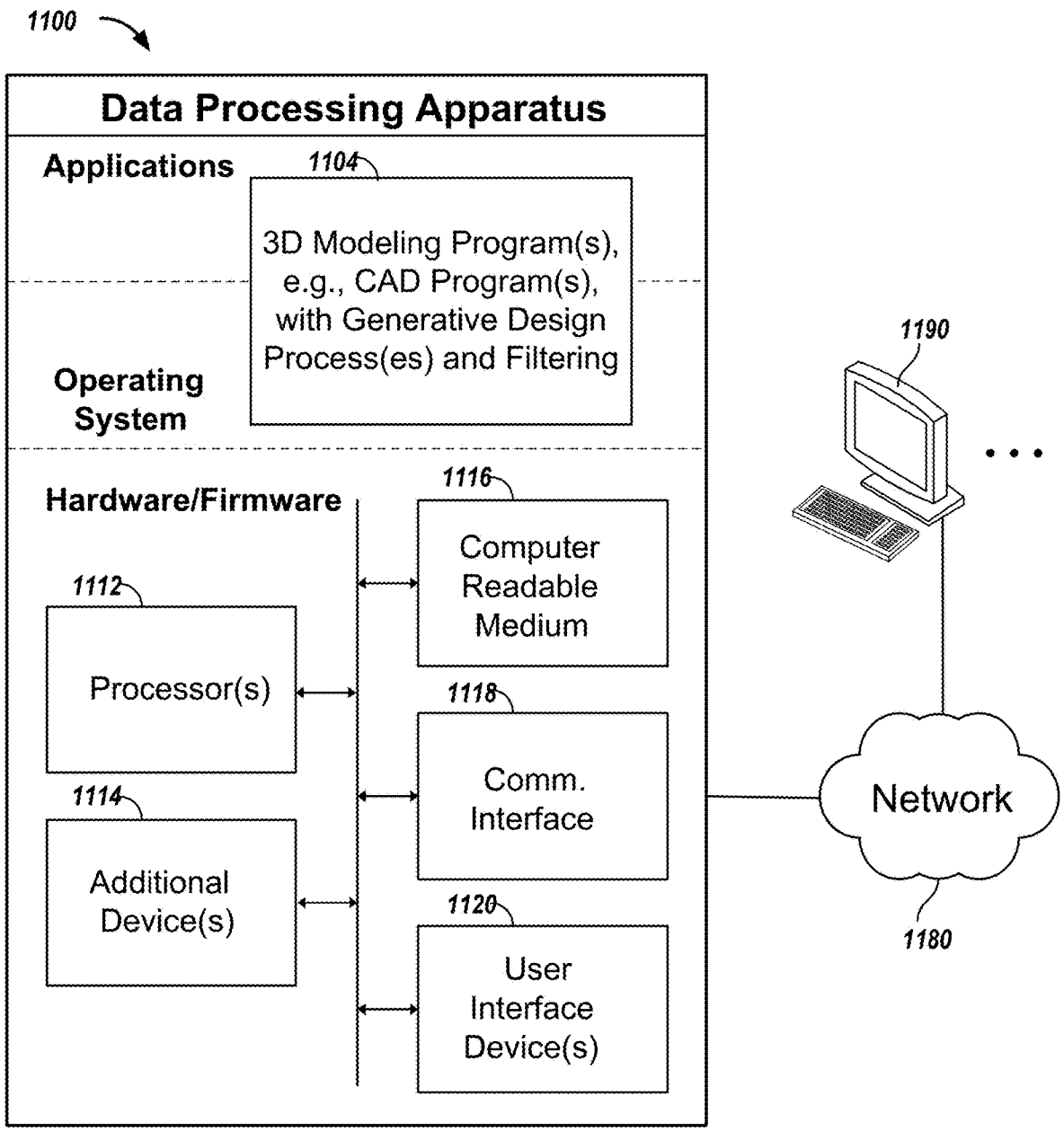
FIG. 11 is a schematic diagram of a data processing system including a data processing apparatus, which can be programmed as a client or as a server.

FIG. 11 is a schematic diagram of a data processing system including a data processing apparatus 1100, which can be programmed as a client or as a server. The data processing apparatus 1100 is connected with one or more computers 1190 through a network 680. While only one computer is shown in FIG. 11 as the data processing apparatus 1100, multiple computers can be used. The data processing apparatus 1100 includes various software modules, which can be distributed between an applications layer and an operating system. These can include executable and/or interpretable software programs or libraries, including tools and services of one or more 3D modeling programs 1104 that implement the filtering systems and techniques described above. Thus, the 3D modeling program(s) 1104 can be CAD program(s) 1104 (such as CAD program(s) 116) and can implement one or more generative design processes (e.g., using level-set based method(s) for generative design) for topology optimization and physical simulation operations (finite element analysis (FEA) or other) that incorporate geometry filtering, simulation results filtering, and/or void generation and insertion with or without multiple milling directions (e.g., multiple part setups). Further, the program(s) 1104 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 1100 also includes hardware or firmware devices including one or more processors 1112, one or more additional devices 1114, a computer readable medium 1116, a communication interface 1118, and one or more user interface devices 1120. Each processor 1112 is capable of processing instructions for execution within the data processing apparatus 1100. In some implementations, the processor 1112 is a single or multi-threaded processor. Each processor 1112 is capable of processing instructions stored on the computer readable medium 1116 or on a storage device such as one of the additional devices 1114. The data processing apparatus 1100 uses the communication interface 1118 to communicate with one or more computers 1190, for example, over the network 1180. Examples of user interface devices 1120 include a display, a camera, a speaker, a microphone, a tactile feedback device, a keyboard, a mouse, and VR and/or AR equipment. The data processing apparatus 1100 can store instructions that implement operations associated with the program(s) described above, for example, on the computer readable medium 1116 or one or more additional devices 1114, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:

modifying, by a computer aided design program, a three dimensional shape of a modeled object, for which a corresponding physical structure is to be created using a manufacturing process, to produce a modified three dimensional shape of the modeled object, wherein the modifying comprises, for each of two or more discrete layers of the three dimensional shape along a direction associated with the manufacturing process,
extracting a two dimensional profile representation of the three dimensional shape in a current discrete layer, the two dimensional profile representation lying in a plane that is perpendicular to the direction associated with the manufacturing process,
offsetting the two dimensional profile representation by an amount associated with the manufacturing process to form an offset two dimensional profile representation of the current discrete layer, and
changing a next discrete layer using the offset two dimensional profile representation of the current discrete layer; and providing, by the computer aided design program, the modified three dimensional shape of the modeled object for use in manufacturing the physical structure using one or more computer-controlled manufacturing systems that employ the manufacturing process.

2. The method of claim 1, wherein the manufacturing process comprises an additive manufacturing process, the direction is a build direction of the additive manufacturing process, and the offsetting comprises offsetting the two dimensional profile representation inward by the amount, which is determined in accordance with a maximum overhang angle for the additive manufacturing process.

3. The method of claim 2, comprising receiving the three dimensional shape of the modeled object, and wherein the modifying comprises preparing the three dimensional shape of the modeled object for the additive manufacturing process.

4. The method of claim 2, wherein the three dimensional shape is a generatively designed three dimensional shape of the modeled object, and the method comprises:

obtaining, by the computer aided design program, a design space for the modeled object, one or more design criteria for the modeled object; and
iteratively varying, by the computer aided design program, a geometry of the generatively designed three dimensional shape of the modeled object in the design space in accordance with the one or more design criteria, wherein the iteratively varying comprises performing numerical simulation of the modeled object in accordance with a current version of the generatively designed three dimensional shape and at least one of the one or more design criteria to produce a current numerical assessment of the modeled object,
updating the current version of the generatively designed three dimensional shape based on the current numerical assessment to produce an updated version of the generatively designed three dimensional shape of the modeled object,
doing the modifying on the updated version to form a next version of the generatively designed three dimensional shape of the modeled object, and
repeating at least the performing, the updating, and the modifying until a predefined number of shape modification iterations have been performed, the generatively designed three dimensional shape of the modeled object in the design space satisfies the one or more design criteria, or both.

5. The method of claim 4, wherein the changing comprises:

performing a Boolean union of the offset two dimensional profile representation with the next discrete layer to produce a larger sized two dimensional profile for the next discrete layer; and
adding geometry to the next discrete layer based on the larger sized two dimensional profile and a distance between the generatively designed three dimensional shape and a build platform for the additive manufacturing process.

6. The method of claim 4, wherein the changing comprises:

computing an exterior skeleton of the next discrete layer;
producing a bridgeable two dimensional profile representation by inflating the exterior skeleton in accordance with a maximum bridging distance for the additive manufacturing process;
subtracting the bridgeable two dimensional profile representation from the offset two dimensional profile representation to produce a bridged two dimensional profile representation;
performing a Boolean union of the bridged two dimensional profile representation with the next discrete layer to produce a larger sized two dimensional profile for the next discrete layer; and
adding geometry to the next discrete layer based on the larger sized two dimensional profile.

7. The method of claim 4, wherein the extracting comprises using interpolation to construct the two dimensional profile representation from the three dimensional shape in the current discrete layer.

8. The method of claim 4, wherein the iteratively varying comprises optimizing a topology of the three dimensional shape of the modeled object.

9. The method of claim 8, wherein the updating comprises, for each location in the current version of the generatively designed three dimensional shape that has a surface angle which exceeds the maximum overhang angle for the additive manufacturing process:

adjusting an amount of change indicated by the current numerical assessment at the location in accordance with the build direction to lower the generatively designed three dimensional shape, with respect to a build platform for the additive manufacturing process, at the location; and
updating the current version of the three dimensional shape in accordance with the adjusting at each location.

10. The method of claim 9, wherein the adjusting is performed in accordance with a scale factor, and the iteratively varying comprises increasing, over multiple iterations of the iteratively varying, the scale factor from zero to a non-zero target value.

11. The method of claim 8, wherein the amount is set by an allowed overhang angle, and the offsetting comprises reducing, over multiple iterations of the iteratively varying, the allowed overhang angle from a first angle to the maximum overhang angle for the additive manufacturing process.

12. The method of claim 4, wherein the iteratively varying comprises producing, for each of multiple iterations, the current version of the generatively designed three dimensional shape of the modeled object by mixing the next version of the generatively designed three dimensional shape from a prior iteration with the updated version of the generatively designed three dimensional shape from the prior iteration, wherein an amount of the next version used in the mixing increases relative to an amount of the updated version, in each of two or more subsequent ones of the multiple iterations.

13. The method of claim 4, wherein the generatively designed three dimensional shape of the modeled object comprises a level-set representation of an implicit surface of the modeled object, and the updating comprises updating the level-set representation in accordance with shape change velocities computed for the implicit surface based on the current numerical assessment.

14. The method of claim 4, wherein the providing comprises:
generating toolpath specifications for an additive manufacturing machine using the generatively designed three dimensional shape of the modeled object; and
manufacturing at least a portion of the physical structure, or a mold for the physical structure, with the additive manufacturing machine using the toolpath specifications.

15. The method of claim 1, wherein the manufacturing process comprises a casting or molding process, the direction is a draw direction of the casting or molding process, and the offsetting comprises offsetting the two dimensional profile representation outward by the amount, which is determined in accordance with a minimum draft angle for the casting or molding process.

16. The method of claim 15, wherein the amount varies across the two or more discrete layers of the three dimensional shape.

17. The method of claim 15, wherein the manufacturing process comprises a molding process having two or more sides, the draw direction is a first draw direction of two or more draw directions corresponding to the two or more sides, the modified three dimensional shape of the modeled object is an output three dimensional shape of the modeled object, the extracting, offsetting and changing produces a first modified three dimensional shape, and the modifying further comprises:
producing a second modified three dimensional shape by, for each of two or more discrete layers of the three dimensional shape along a second draw direction of the two or more draw directions,
extracting a second two dimensional profile representation of the three dimensional shape in a second current discrete layer, the second two dimensional profile representation lying in a plane that is perpendicular to the second draw direction,
offsetting the second two dimensional profile representation outward by the amount to form a second offset two dimensional profile representation of the second current discrete layer, and
changing a second next discrete layer using the second offset two dimensional profile representation of the second current discrete layer; and
performing a Boolean intersection of the first modified three dimensional shape and the second modified three dimensional shape to produce the output three dimensional shape of the modeled object.

18. The method of claim 1, wherein the providing comprises saving the three dimensional shape of the modeled object to a permanent storage device for use in manufacturing the physical structure using the one or more computer-controlled manufacturing systems.

19. A system comprising:
a non-transitory storage medium having instructions of a computer aided design program stored thereon; and
one or more data processing apparatus configured to run the instructions of the computer aided design program to cause the one or more data processing apparatus to:
modify, by a computer aided design program, a three dimensional shape of a modeled object, for which a corresponding physical structure is to be created using a manufacturing process, to produce a modified three dimensional shape of the modeled object, wherein the modifying comprises, for each of two or more discrete layers of the three dimensional shape along a direction associated with the manufacturing process,
extracting a two dimensional profile representation of the three dimensional shape in a current discrete layer, the two dimensional profile representation lying in a plane that is perpendicular to the direction associated with the manufacturing process,
offsetting the two dimensional profile representation by an amount associated with the manufacturing process to form an offset two dimensional profile representation of the current discrete layer, and
changing a next discrete layer using the offset two dimensional profile representation of the current discrete layer; and
provide, by the computer aided design program, the modified three dimensional shape of the modeled object for use in manufacturing the physical structure using one or more computer-controlled manufacturing systems that employ the manufacturing process.

20. A non-transitory computer-readable medium encoding a computer aided design program operable to cause one or more data processing apparatus to perform operations comprising:
modifying, by a computer aided design program, a three dimensional shape of a modeled object, for which a corresponding physical structure is to be created using a manufacturing process, to produce a modified three dimensional shape of the modeled object, wherein the modifying comprises, for each of two or more discrete layers of the three dimensional shape along a direction associated with the manufacturing process,
extracting a two dimensional profile representation of the three dimensional shape in a current discrete layer, the two dimensional profile representation lying in a plane that is perpendicular to the direction associated with the manufacturing process,
offsetting the two dimensional profile representation by an amount associated with the manufacturing process to form an offset two dimensional profile representation of the current discrete layer, and changing a next discrete layer using the offset two dimensional profile representation of the current discrete layer; and providing, by the computer aided design program, the modified three dimensional shape of the modeled object for use in manufacturing the physical structure using one or more computer-controlled manufacturing systems that employ the manufacturing process.

21. The system of claim 19, wherein the manufacturing process comprises an additive manufacturing process, the direction is a build direction of the additive manufacturing process, and the offsetting comprises offsetting the two dimensional profile representation inward by the amount, which is determined in accordance with a maximum overhang angle for the additive manufacturing process.

22. The system of claim 21, wherein the non-transitory storage medium has further instructions that when executed by the one or more data processing apparatus cause the one or more data processing operations to receive the three dimensional shape of the modeled object, and wherein the modifying comprises preparing the three dimensional shape of the modeled object for the additive manufacturing process.

23. The system of claim 21, wherein the three dimensional shape is a generatively designed three dimensional shape of the modeled object, and the non-transitory storage medium has further instructions that when executed by the one or more data processing apparatus cause the one or more data processing operations to:

obtain, by the computer aided design program, a design space for the modeled object, one or more design criteria for the modeled object; and iteratively vary, by the computer aided design program, a geometry of the generatively designed three dimensional shape of the modeled object in the design space in accordance with the one or more design criteria, wherein the iteratively varying comprises performing numerical simulation of the modeled object in accordance with a current version of the generatively designed three dimensional shape and at least one of the one or more design criteria to produce a current numerical assessment of the modeled object, updating the current version of the generatively designed three dimensional shape based on the current numerical assessment to produce an updated version of the generatively designed three dimensional shape of the modeled object, doing the modifying on the updated version to form a next version of the generatively designed three dimensional shape of the modeled object, and repeating at least the performing, the updating, and the modifying until a predefined number of shape modification iterations have been performed, the generatively designed three dimensional shape of the modeled object in the design space satisfies the one or more design criteria, or both.

24. The system of claim 23, wherein the changing comprises:

performing a Boolean union of the offset two dimensional profile representation with the next discrete layer to produce a larger sized two dimensional profile for the next discrete layer; and adding geometry to the next discrete layer based on the larger sized two dimensional profile and a distance between the generatively designed three dimensional shape and a build platform for the additive manufacturing process.

25. The system of claim 23, wherein the changing comprises:

computing an exterior skeleton of the next discrete layer;

producing a bridgeable two dimensional profile representation by inflating the exterior skeleton in accordance with a maximum bridging distance for the additive manufacturing process;

subtracting the bridgeable two dimensional profile representation from the offset two dimensional profile representation to produce a bridged two dimensional profile representation;

performing a Boolean union of the bridged two dimensional profile representation with the next discrete layer to produce a larger sized two dimensional profile for the next discrete layer; and adding geometry to the next discrete layer based on the larger sized two dimensional profile.

26. The system of claim 23, wherein the extracting comprises using interpolation to construct the two dimensional profile representation from the three dimensional shape in the current discrete layer.

27. The system of claim 23, wherein the iteratively varying comprises optimizing a topology of the three dimensional shape of the modeled object.

28. The system of claim 27, wherein the updating comprises, for each location in the current version of the generatively designed three dimensional shape that has a surface angle which exceeds the maximum overhang angle for the additive manufacturing process:

adjusting an amount of change indicated by the current numerical assessment at the location in accordance with the build direction to lower the generatively designed three dimensional shape, with respect to a build platform for the additive manufacturing process, at the location; and updating the current version of the three dimensional shape in accordance with the adjusting at each location.

29. The system of claim 28, wherein the adjusting is performed in accordance with a scale factor, and the iteratively varying comprises increasing, over multiple iterations of the iteratively varying, the scale factor from zero to a non-zero target value.

30. The system of claim 27, wherein the amount is set by an allowed overhang angle, and the offsetting comprises reducing, over multiple iterations of the iteratively varying, the allowed overhang angle from a first angle to the maximum overhang angle for the additive manufacturing process.

31. The system of claim 23, wherein the iteratively varying comprises producing, for each of multiple iterations, the current version of the generatively designed three dimensional shape of the modeled object by mixing the next version of the generatively designed three dimensional shape from a prior iteration with the updated version of the generatively designed three dimensional shape from the prior iteration, wherein an amount of the next version used in the mixing increases relative to an amount of the updated version, in each of two or more subsequent ones of the multiple iterations.

32. The system of claim 23, wherein the generatively designed three dimensional shape of the modeled object comprises a level-set representation of an implicit surface of the modeled object, and the updating comprises updating the level-set representation in accordance with shape change velocities computed for the implicit surface based on the current numerical assessment.

33. The system of claim 23, wherein the providing comprises:
generating toolpath specifications for an additive manufacturing machine using the generatively designed three dimensional shape of the modeled object; and
manufacturing at least a portion of the physical structure, or a mold for the physical structure, with the additive manufacturing machine using the toolpath specifications.

34. The system of claim 19, wherein the manufacturing process comprises a casting or molding process, the direction is a draw direction of the casting or molding process, and the offsetting comprises offsetting the two dimensional profile representation outward by the amount, which is determined in accordance with a minimum draft angle for the casting or molding process.

35. The system of claim 34, wherein the amount varies across the two or more discrete layers of the three dimensional shape.

36. The system of claim 34, wherein the manufacturing process comprises a molding process having two or more sides, the draw direction is a first draw direction of two or more draw directions corresponding to the two or more sides, the modified three dimensional shape of the modeled object is an output three dimensional shape of the modeled object, the extracting, offsetting and changing produces a first modified three dimensional shape, and the modifying further comprises:
producing a second modified three dimensional shape by, for each of two or more discrete layers of the three dimensional shape along a second draw direction of the two or more draw directions,
extracting a second two dimensional profile representation of the three dimensional shape in a second current discrete layer, the second two dimensional profile representation lying in a plane that is perpendicular to the second draw direction,
offsetting the second two dimensional profile representation outward by the amount to form a second offset two dimensional profile representation of the second current discrete layer, and
changing a second next discrete layer using the second offset two dimensional profile representation of the second current discrete layer; and
performing a Boolean intersection of the first modified three dimensional shape and the second modified three dimensional shape to produce the output three dimensional shape of the modeled object.

37. The system of claim 19, wherein the providing comprises saving the three dimensional shape of the modeled object to a permanent storage device for use in manufacturing the physical structure using the one or more computer-controlled manufacturing systems.

38. The non-transitory computer-readable medium of claim 20, wherein the manufacturing process comprises an additive manufacturing process, the direction is a build direction of the additive manufacturing process, and the offsetting comprises offsetting the two dimensional profile representation inward by the amount, which is determined in accordance with a maximum overhang angle for the additive manufacturing process.

39. The non-transitory computer-readable medium of claim 38, wherein the operations comprise receiving the three dimensional shape of the modeled object, and wherein the modifying comprises preparing the three dimensional shape of the modeled object for the additive manufacturing process.

40. The non-transitory computer-readable medium of claim 38, wherein the three dimensional shape is a generatively designed three dimensional shape of the modeled object, and the operations comprise:
obtaining, by the computer aided design program, a design space for the modeled object, one or more design criteria for the modeled object; and
iteratively varying, by the computer aided design program, a geometry of the generatively designed three dimensional shape of the modeled object in the design space in accordance with the one or more design criteria, wherein the iteratively varying comprises
performing numerical simulation of the modeled object in accordance with a current version of the generatively designed three dimensional shape and at least one of the one or more design criteria to produce a current numerical assessment of the modeled object,
updating the current version of the generatively designed three dimensional shape based on the current numerical assessment to produce an updated version of the generatively designed three dimensional shape of the modeled object,
doing the modifying on the updated version to form a next version of the generatively designed three dimensional shape of the modeled object, and
repeating at least the performing, the updating, and the modifying until a predefined number of shape modification iterations have been performed, the generatively designed three dimensional shape of the modeled object in the design space satisfies the one or more design criteria, or both.

41. The non-transitory computer-readable medium of claim 40, wherein the changing comprises:
performing a Boolean union of the offset two dimensional profile representation with the next discrete layer to produce a larger sized two dimensional profile for the next discrete layer; and
adding geometry to the next discrete layer based on the larger sized two dimensional profile and a distance between the generatively designed three dimensional shape and a build platform for the additive manufacturing process.

42. The non-transitory computer-readable medium of claim 40, wherein the changing comprises:
computing an exterior skeleton of the next discrete layer;
producing a bridgeable two dimensional profile representation by inflating the exterior skeleton in accordance with a maximum bridging distance for the additive manufacturing process;
subtracting the bridgeable two dimensional profile representation from the offset two dimensional profile representation to produce a bridged two dimensional profile representation;
performing a Boolean union of the bridged two dimensional profile representation with the next discrete layer to produce a larger sized two dimensional profile for the next discrete layer; and
adding geometry to the next discrete layer based on the larger sized two dimensional profile.

43. The non-transitory computer-readable medium of claim 40, wherein the extracting comprises using interpolation to construct the two dimensional profile representation from the three dimensional shape in the current discrete layer.

44. The non-transitory computer-readable medium of claim 40, wherein the iteratively varying comprises optimizing a topology of the three dimensional shape of the modeled object.

45. The non-transitory computer-readable medium of claim 44, wherein the updating comprises, for each location in the current version of the generatively designed three dimensional shape that has a surface angle which exceeds the maximum overhang angle for the additive manufacturing process:
 adjusting an amount of change indicated by the current numerical assessment at the location in accordance with the build direction to lower the generatively designed three dimensional shape, with respect to a build platform for the additive manufacturing process, at the location; and
 updating the current version of the three dimensional shape in accordance with the adjusting at each location.

46. The non-transitory computer-readable medium of claim 45, wherein the adjusting is performed in accordance with a scale factor, and the iteratively varying comprises increasing, over multiple iterations of the iteratively varying, the scale factor from zero to a non-zero target value.

47. The non-transitory computer-readable medium of claim 44, wherein the amount is set by an allowed overhang angle, and the offsetting comprises reducing, over multiple iterations of the iteratively varying, the allowed overhang angle from a first angle to the maximum overhang angle for the additive manufacturing process.

48. The non-transitory computer-readable medium of claim 40, wherein the iteratively varying comprises producing, for each of multiple iterations, the current version of the generatively designed three dimensional shape of the modeled object by mixing the next version of the generatively designed three dimensional shape from a prior iteration with the updated version of the generatively designed three dimensional shape from the prior iteration, wherein an amount of the next version used in the mixing increases relative to an amount of the updated version, in each of two or more subsequent ones of the multiple iterations.

49. The non-transitory computer-readable medium of claim 40, wherein the generatively designed three dimensional shape of the modeled object comprises a level-set representation of an implicit surface of the modeled object, and the updating comprises updating the level-set representation in accordance with shape change velocities computed for the implicit surface based on the current numerical assessment.

50. The non-transitory computer-readable medium of claim 40, wherein the providing comprises:
 generating toolpath specifications for an additive manufacturing machine using the generatively designed three dimensional shape of the modeled object; and
 manufacturing at least a portion of the physical structure, or a mold for the physical structure, with the additive manufacturing machine using the toolpath specifications.

51. The non-transitory computer-readable medium of claim 20, wherein the manufacturing process comprises a casting or molding process, the direction is a draw direction of the casting or molding process, and the offsetting comprises offsetting the two dimensional profile representation outward by the amount, which is determined in accordance with a minimum draft angle for the casting or molding process.

52. The non-transitory computer-readable medium of claim 51, wherein the amount varies across the two or more discrete layers of the three dimensional shape.

53. The non-transitory computer-readable medium of claim 51, wherein the manufacturing process comprises a molding process having two or more sides, the draw direction is a first draw direction of two or more draw directions corresponding to the two or more sides, the modified three dimensional shape of the modeled object is an output three dimensional shape of the modeled object, the extracting, offsetting and changing produces a first modified three dimensional shape, and the modifying further comprises:
 producing a second modified three dimensional shape by, for each of two or more discrete layers of the three dimensional shape along a second draw direction of the two or more draw directions,
  extracting a second two dimensional profile representation of the three dimensional shape in a second current discrete layer, the second two dimensional profile representation lying in a plane that is perpendicular to the second draw direction,
  offsetting the second two dimensional profile representation outward by the amount to form a second offset two dimensional profile representation of the second current discrete layer, and
  changing a second next discrete layer using the second offset two dimensional profile representation of the second current discrete layer; and
 performing a Boolean intersection of the first modified three dimensional shape and the second modified three dimensional shape to produce the output three dimensional shape of the modeled object.

54. The non-transitory computer-readable medium of claim 20, wherein the providing comprises saving the three dimensional shape of the modeled object to a permanent storage device for use in manufacturing the physical structure using the one or more computer-controlled manufacturing systems.

* * * * *